US012373713B2

(12) United States Patent
Scheutz

(10) Patent No.: US 12,373,713 B2
(45) Date of Patent: Jul. 29, 2025

(54) SYSTEMS AND METHODS FOR SYNERGISTIC SHARING OF ARCHITECTURAL COMPONENTS OF INTELLIGENT AGENTS

(71) Applicant: Trustees of Tufts College, Medford, MA (US)

(72) Inventor: Matthias J. Scheutz, Boston, MA (US)

(73) Assignee: Trustees of Tufts College, Medford, MA (US)

( * ) Notice: Subject to any disclaimer, the term of this patent is extended or adjusted under 35 U.S.C. 154(b) by 1101 days.

(21) Appl. No.: 16/978,261

(22) PCT Filed: Mar. 5, 2019

(86) PCT No.: PCT/US2019/020730
§ 371 (c)(1),
(2) Date: Sep. 4, 2020

(87) PCT Pub. No.: WO2019/173325
PCT Pub. Date: Sep. 12, 2019

(65) Prior Publication Data
US 2020/0410377 A1 Dec. 31, 2020

Related U.S. Application Data

(60) Provisional application No. 62/638,752, filed on Mar. 5, 2018.

(51) Int. Cl.
*G06F 9/48* (2006.01)
*G06F 9/54* (2006.01)
*G06N 5/043* (2023.01)

(52) U.S. Cl.
CPC .......... *G06N 5/043* (2013.01); *G06F 9/4843* (2013.01); *G06F 9/542* (2013.01)

(58) Field of Classification Search
CPC ........ G06N 5/043; G06F 9/542; G06F 9/4843
See application file for complete search history.

(56) References Cited

U.S. PATENT DOCUMENTS 7,036,128 B1 * 4/2006 Julia ................. G06N 5/043
707/E17.139
7,440,992 B1 * 10/2008 McMahon ........... G06F 9/5055
709/202

(Continued)

OTHER PUBLICATIONS

International Search Report. PCT Application No. PCT/US2019/020730, Jun. 21, 2019, pp. 1-4.

*Primary Examiner* — Beau D Spratt
(74) *Attorney, Agent, or Firm* — Occhiuti & Rohlicek LLP

(57) ABSTRACT

Systems and methods are described for sharing components among intelligent agents, such as robot agents that perform tasks autonomously. The intelligent agents may include functional components implemented in a middleware layer that provides an interface among the functional components. The functional components may include components for sensory information processing, managing goals and tasks, planning tasks, knowledge bases, and effector information processing. The middleware layer of the intelligent agents may include a component sharing layer. The component sharing layer may search for and identify components running on agents of an agent group that satisfy one or more constraints specified by a requesting component. The component sharing layer may establish a connection between the requesting component and the identified component. The requesting component may utilize services of the identified component to complete a goal or task.

14 Claims, 11 Drawing Sheets

(56) References Cited

U.S. PATENT DOCUMENTS

| | | | |
|---|---|---|---|
| 7,926,029 B1* | 4/2011 | Stoyen | G06F 8/20 |
| | | | 717/102 |
| 2005/0022194 A1* | 1/2005 | Weir | G06F 9/542 |
| | | | 718/100 |
| 2005/0108453 A1 | 5/2005 | Maturana et al. | |
| 2010/0286824 A1 | 11/2010 | Solomon | |
| 2013/0254163 A1* | 9/2013 | Savage | G06F 16/182 |
| | | | 707/723 |
| 2015/0005937 A1* | 1/2015 | Ponulak | G06N 3/049 |
| | | | 700/250 |
| 2015/0066817 A1 | 3/2015 | Slayton et al. | |
| 2015/0185729 A1 | 7/2015 | Kuffner, Jr. et al. | |
| 2015/0215350 A1* | 7/2015 | Slayton | G06F 9/453 |
| | | | 709/204 |
| 2015/0261570 A1* | 9/2015 | Goldman | G06F 9/5083 |
| | | | 718/102 |
| 2016/0085584 A1* | 3/2016 | Pedersen | G06N 5/02 |
| | | | 718/102 |
| 2017/0050321 A1 | 2/2017 | Look et al. | |
| 2019/0147348 A1* | 5/2019 | Ng | G06F 9/453 |
| | | | 706/46 |
| 2019/0378019 A1* | 12/2019 | Scheutz | G06F 40/00 |
| 2021/0176638 A1* | 6/2021 | Heldt-Sheller | H04W 12/06 |

* cited by examiner

SYSTEMS AND METHODS FOR SYNERGISTIC SHARING OF ARCHITECTURAL COMPONENTS OF INTELLIGENT AGENTS

CROSS-REFERENCE TO RELATED APPLICATIONS

This application is a 371 U.S. National Phase of PCT Application No. PCT/US2019/020730, filed on Mar. 5, 2019, which claims the benefit of U.S. Provisional Application No. 62/638,752 filed on Mar. 5, 2018.

BRIEF DESCRIPTION OF THE DRAWINGS

The description below refers to the accompanying drawings, of which.

DETAILED DESCRIPTION OF ILLUSTRATIVE EMBODIMENTS

Figure 1:
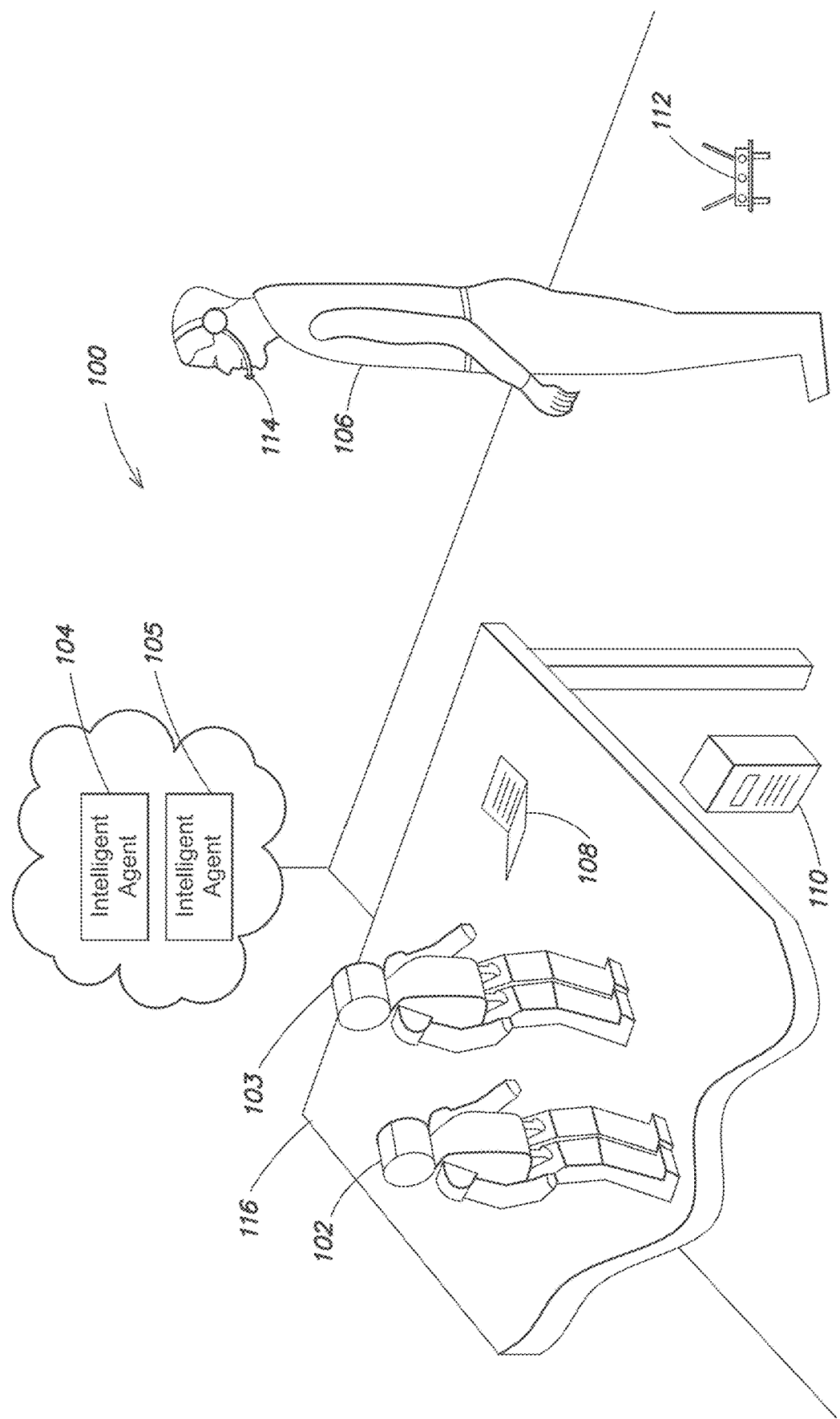
FIG. 1 is a schematic illustration of an example environment in accordance with one or more embodiments of the present disclosure.

The present disclosure relates to systems and methods for sharing components among intelligent agents, such as robot agents, virtual agents, or more generally software systems that perform tasks autonomously. The intelligent agents may include functional components implemented in a middleware layer that provides an interface among the functional components. The functional components may include components for sensory information processing, data communication, managing goals and tasks, planning tasks and activities, knowledge bases, machine learning, reasoning and inference, decision-making, and actuator and effector information processing, among others. The middleware layer, which may be referred to simply as middleware, of the intelligent agents may include a component sharing layer. The component sharing layer may be configured to provide services to the functional component of an agent. For example, the component sharing layer may include a component discovery service, an access control service, a connection service, an information and data routing service, a notification service, and a naming service.

In some embodiments, multiple components of intelligent agents or whole agents may be organized into agent groups. The data communication system may establish communication channels among the components or agents that belong to a given group. The component discovery service at a first intelligent agent of the group may query the other intelligent agents to determine the types of functional components available at the other intelligent agents for sharing. A goal manager of the first intelligent agent, which manages the agent's goals and tasks, may establish a goal for the first intelligent agent, for example in response to an instruction or command from a human operator. The action planning component of the first intelligent agent, which plans how tasks and goals can be achieved by performing sequences of actions by the agent, may establish an action plan for achieving the goal based on information in its knowledge base. The action planning component may determine, however, that the first intelligent agent lacks a functional component needed to implement the action plan. The component discovery service may determine whether any of the other intelligent agents in its group include the type of functional component needed by the first intelligent agent to carry out the action plan. If a second intelligent agent is identified as having the type of functional component needed by the first intelligent agent, the routing service may determine the manner by which the first intelligent agent may communicate with the second intelligent agent. For example, the routing service may determine that one or more intermediary intelligent agents must be used in order to communicate with the second intelligent agent. The connection service may establish a connection between the action planner of the first intelligent agent and the functional component of the second intelligent agent using the determined route. The access control service of the second intelligent agent may determine whether to allow the first intelligent agent to access its functional component. If access is granted, the action planner of the first intelligent agent may utilize the established connection to issue requests for service to the functional component at the second intelligent agent in order to carry out the action plan. The naming services at the first and second intelligent agents ensure that services provided by the functional component are identified as being generated on behalf of the first intelligent agent. When the functional component is no longer needed by the first intelligent agent, e.g., upon completion of the action or the goal, the connection service may disconnect the action planner from the functional component of the second intelligent agent.

Multi-Agent Environment

FIG. 1 is a schematic illustration of an example environment 100 in accordance with one or more embodiments of the present disclosure. Located in the environment 100 are several intelligent systems 102-105 and a human instructor 106. One or more of the intelligent systems, such as the intelligent systems 102 and 103, may be implemented as robot agents. In some embodiments, the robot agents 102 and 103 may include different hardware/software architectures and different systems, resulting in the robot agents 102 and 103 having different capabilities. One or more intelligent systems, such as the intelligent systems 104 and 105, may be implemented as a cloud-based intelligent agents. Together, the intelligent systems 102-105 may form an agent group of heterogeneous intelligent systems. The robot agents 102 and 103 themselves may form a cohort of heterogeneous robot agents. A robot agent may refer to an autonomous reactive and proactive software agent that possesses its own control architecture and threads. A robot agent may respond to messages and/or events in order to attain goals, and may support social interaction. A robot agent may be implemented on a single host, such as a single robot platform, or it may be distributed over multiple hosts and/or computational nodes. The robot agents may be autonomous and capable of movement within and interaction with the environment 100, the human instructor 106, and each other.

A cloud-based intelligent agent may refer to an autonomous reactive and proactive software agent that possesses its own control architecture and control threads. A cloud-based intelligent agent may respond to messages and/or events in order to attain goals, and may support social interaction. A cloud-based intelligent agent may be distributed across a plurality of cloud-based servers and/or computational nodes. While not capable of movement, a cloud-based intelligent agent, such as intelligent agents 104 and 105, may be capable of spoken and/or visual interaction with the human instructor 106. The cloud-based intelligent agents 104 and 105 may also interact with one or more other intelligent systems, such as one or more of the robot agents 102 and 103. Examples of cloud-based intelligent agents include the Alexa intelligent personal assistant from Amazon.com, Inc. of Seattle, WA, which may be accessed through the Echo microphone/speaker interface also from Amazon, the Google Assistant intelligent personal assistant from Google Inc. of Mountain View, CA, which may be accessed through the Google Home microphone/speaker interface also from Google, and the Siri intelligent personal assistant from Apple Inc. of Cupertino, CA, which may be accessed through iPhone, iPad, and other devices also from Apple.

The environment 100 may further include one or more data processing devices, such as a laptop computer 108, which is accessible to the human instructor 106, and a server 110 or other data processing device. One or more network devices, such as a wireless router 112, may be located within the environment 100. The one or more network devices may establish one or more data communication networks within the environment 100. The human instructor 106 may wear a headset 114, which may be operably connected to the laptop computer 108, for example using the Bluetooth communication protocol. Within the environment 100 are a plurality of objects, such as a table 116. The robot agents 102 and 103 are disposed on the table 116.

It should be understood that the environment 100 of FIG. 1 is meant for illustrative purposes only. The present disclosure may be used in other, possibly far more complex, environments. For example, the human instructor 106 and/or one or more other human instructors may be located remotely from the environment 100 and still interact with one or more of the agents. Remotely may refer to the other human instructors being beyond the range of the vision and auditory systems of the robot agents 102 and 103.

The robot agents 102 and 103 and the cloud-based agents 104 and 105 may cooperate to form a multi-agent system (MAS). A MAS may be composed of multiple robotic and virtual agents that communicate and interact with each other in order to achieve a common goal or objective. One or more agents of the MAS may also pursue independent goals. In addition, the elements that form the robot agents 102 and 103 and the cloud-based agents 104 and 105 may be arranged in the form of a MAS agent architecture with individual agent architectures for the various robotic and virtual agents.

Agent Architecture

An agent architectures may be a blueprint of agent control systems, which may consist of various functional components that together control the operation of an agent. Depending on the type of agent, e.g., a physical robot assembling parts at a factory, a virtual agent giving health care advice, a broker agent negotiating stock prices, a virtual travel agent making plane reservations, etc., different functional components will be included in the agent architecture. For example, robot agents may include sensing components, actuation components, and path and motion planning components, among others. Broker agents may include stock price prediction components, among others. Virtual travel agents may include itinerary planning components agents, among others. Complex artificial agents that require parallel processing of their functional components may be implemented in middleware, such as the Robot Operating System (ROS) in the case of robots, or Common Object Request Broker Architecture (CORBA) in the case of virtual travel agent. The middleware may allow for the distribution of functional components across multiple computers and provides various Application Programming Interface (API) functions to establish connectivity and enable communication among them. The functional components may be distributed on a single computer over multiple operating system (OS) threads or processes, or across various computers in a Local Area Network (LAN), Wide Area Network (WAN), cluster, grid, or cloud setting, among other distributed computing architectures. The middleware used to implement agent architectures may be unaware of the functional role of the functional components within their agent architectures and may treat them as black boxes. The functional components may be unaware of the implementing middleware, and may only consume its services, e.g., for component discovery and message passing.

In some embodiments, the present disclosure relates to an intelligent middleware that includes mechanisms for sharing functional components across heterogeneous agent architectures. The intelligent middleware may enable agents to share functional components, thereby granting agents access to and use of functional components they otherwise would not have. As an example, the intelligent middleware may enable an agent that lacks a camera and thus cannot process visual information to perform perceptual operations by sharing the camera and vision component(s) of one or more other agents. The present disclosure may also enable new capabilities that would not otherwise have been possible. For example, the present disclosure may provide for sharing learned knowledge among agents that have not acquired the knowledge, or connecting knowledge bases so that agents may jointly reason about events as a group.

The present disclosure may increase the mutual awareness, access, and information exchange between both agent architectures and middleware layers, leading to more robust agent operations, better resource utilization and agent reliability, and more informed communications among agents and humans, e.g., about the state of the system and/or environment. The present disclosure may also enable the easy sharing of information, knowledge, and capabilities across different heterogeneous agents without the need to re-implement functionality present in one and not the other agent. The present disclosure may also enable the parallel acquisition of multi-modal information and parallel learning of the capabilities that individual agents would not be able to achieve without component sharing. The present disclosure may also enable agents to gain adhoc access to non-shared components in agent architectures that can dynamically and temporarily increase the functionality of an agent architecture. The present disclosure may also enable the dynamic distribution of computations across agents based on available agent functionality to improve capability and performance. The present disclosure may also enable the dynamic generation of a "super-agent" that can guide the behavior of many distributed agents in a systematic manner based on access to relevant functional components in these agents.

Figure 2:
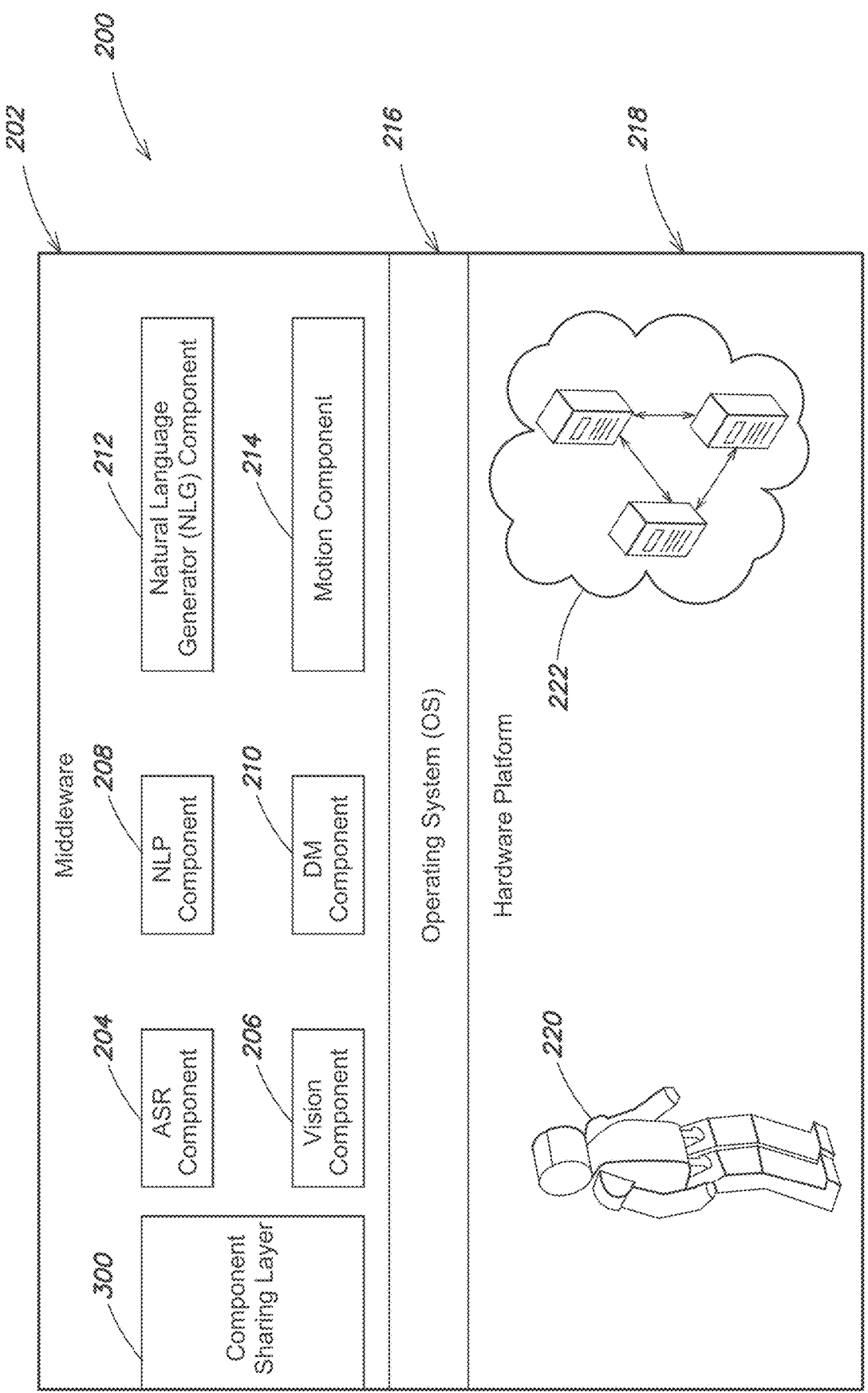
FIG. 2 is a schematic illustration of an example agent architecture 200 in accordance with one or more embodiments of the present disclosure.

FIG. 2 is a schematic illustration of an example agent architecture 200 in accordance with one or more embodiments of the present disclosure. The agent architecture 200 may include middleware 202 that may include a plurality of functional components typically found in autonomous agent architectures. For example, the middleware 202 may include an automatic speech recognition (ASR) component 204, a vision component 206, a natural language processing (NLP) component 208, a dialog manager (DM) component 210, a natural language generator (NLG) component 212, and a motion component 214, among others. In accordance with one or more embodiments, the middleware 202 also may include a component sharing layer 300. The agent architecture 200 may further include at least one operating system (OS) indicated at 216 that interfaces with the middleware 202. In some embodiments, an agent architecture may have several different operating systems, and the middleware may be running across these operating systems.

The middleware 202 and the OS 216 may be running on one or more hardware platforms and/or computational nodes as indicated at 218. For example, to the extent the agent architecture 200 is a robot agent, the middleware 202 and the OS 216 may be running on one or more robot platforms as indicated at 220. For example, the middleware 202 and the OS 216 may be disposed on a single physical robot platform 220 that includes on-board computational infrastructure in addition to sensory and motor control boards to gather information from sensors and provide actuation instructions. The on-board computational infrastructure may allow the robot platform 220 to communicate with other robot platforms and data processing devices. To the extent the agent architecture 200 is a virtual agent, the middleware 202 and the OS 216 may be running one or more computing devices, such as a server cloud 222, or other data processing resources.

The OS 216 may support data communication with other intelligent agents. The data communication may conform to Ethernet or Wi-Fi data communication protocols, although other forms of data communication may be used, such as Infrared (IR), Bluetooth, cellular data, etc. For example, the OS 216 may provide Internet Protocol (IP) features, such as packet routing, packet forwarding and ad hoc networking to be able to (1) form and use ad hoc networks among multiple intelligent systems within networking capabilities and (2) route packets through an ad hoc Wi-Fi or other network of the cohort of intelligent systems. Suitable operating systems include the Windows family of operating systems from Microsoft Corp. of Redmond, WA, the Linux operating system and the Mac OS family of operating systems from Apple Inc. of Cupertino, CA, among others. In some embodiments, a real time operating system may be used.

Exemplary physical robot platforms suitable for use with the present disclosure include the Nao Version 6 robot from SoftBank Robotics Group Corp. of Tokyo JAPAN, the PR2 robot from Willow Garage, Inc. of Palo Alto, CA, the Mobile Dexterous Social Robot from Xitome Design, LLC of Warwick, RI, the Baxter and Sawyer robots from Rethink Robotics of Boston, MA, and the industrial robots from Kuka Robotics Corp. of Augsburg, Germany, among others. The Nao robot is described in U.S. Pat. No. 9,327,400 for a Control-Command Architecture for a Mobile Robot Using Articulated Limbs and U.S. Pat. No. 8,942,849 for a Humanoid Robot Equipped with a Natural Dialogue Interface, Method for Controlling the Robot and Corresponding Program, which are hereby incorporated by reference in their entireties. The PR2 robot platform is described in U.S. Pat. Publication No. 2015/0336264 for a Humanoid Robotics System and Methods, published Nov. 26, 2015, which is hereby incorporated by reference in its entirety.

It should be understood that FIG. 2 is meant for illustrative purposes only. In other embodiments or implementations, one or more of the functional components may be realized in different ways, one or more of the functional components may be omitted, multiple instances of the same type of functional component may be included, and/or other functional components may be included in the middleware 202. For example in some embodiments a set of functional components may be realized in a single functional component, or a functional component may be realized in multiple functional components. Furthermore, the way functionality is described as being distributed or split over multiple functional components is not essential for implementing and using the present disclosure. Other distributions of the described functionality may be utilized.

In other embodiments, one or more or all of the functional components 204-218 may be distributed across multiple physical robot platforms and/or data processing devices.

One or more of the functional components 204-214 may themselves be realized or implemented through a plurality of subsystems or elements. For example, one or more of the functional components 204-214 may implemented through elements organized in a distributed integrated affect, reflection, cognition (DIARC) Architecture. The DIARC architecture is described at least in part in M. Scheutz et al. *An Overview of the Distributed Integrated Cognition Affect and Reflection DIARC Architecture* (2018) and P. Schermerhorn et al. *DIARC: A Testbed for Natural Human-Robot Interaction* (2006), which papers are hereby incorporated by reference in their entireties.

Component Sharing Layer

Figure 3:
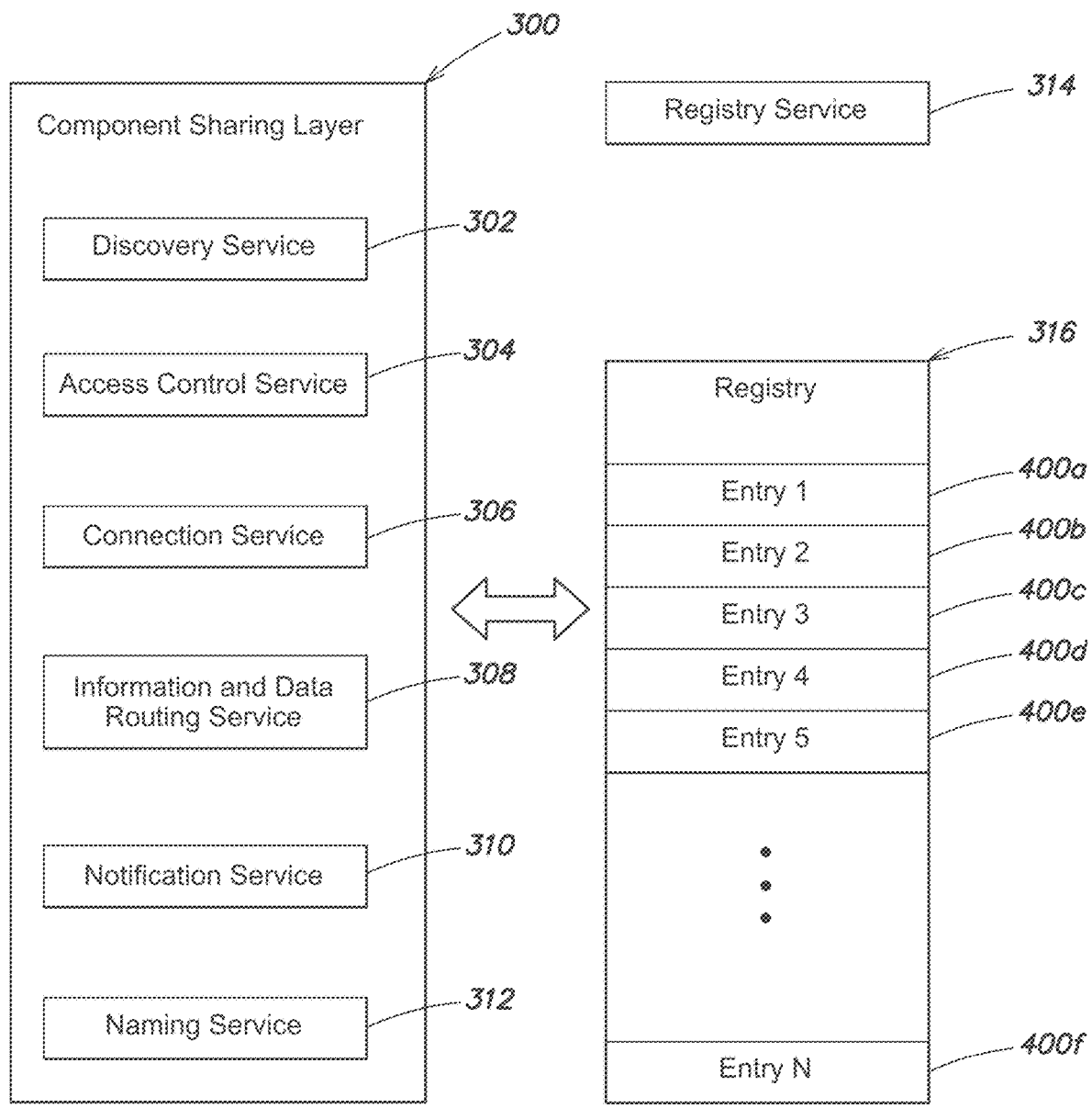
FIG. 3 is a functional illustration of an example of the component sharing layer 300 in accordance with one or more embodiments.

FIG. 3 is a functional illustration of an example of the component sharing layer 300 in accordance with one or more embodiments. The component sharing layer 300 may provide a plurality of services to the functional components that, along with the component sharing layer 300, are included in the middleware. For example, the component sharing layer 300 may include a discovery service 302, an access control service 304, a connection service 306, an information and data routing service 308, a notification service 310, and a naming service 312. The component sharing layer 300 and/or one or more of the services 302-312 may provide one or more Application Programming Interfaces (APIs) to local and remote functional components.

The component sharing layer 300 may also include or have access to one or more services and/or data structures of the middleware 202, such as a registry service 314 and a registry 316. The registry 316 may be used to keep track of the functional components and other elements of the respective agent. The registry 316 may be a repository of available components and/or services of the respective agent. The registry 316 may be utilized as a transaction broker among functional components of the agent. The registry 316 may include a plurality of entries, such as entries 400a-f. In some embodiments, each entry 400 of the registry 316 may store information and/or data concerning a respective functional component and/or service that is available for sharing among agents of an agent group.

Figure 4:
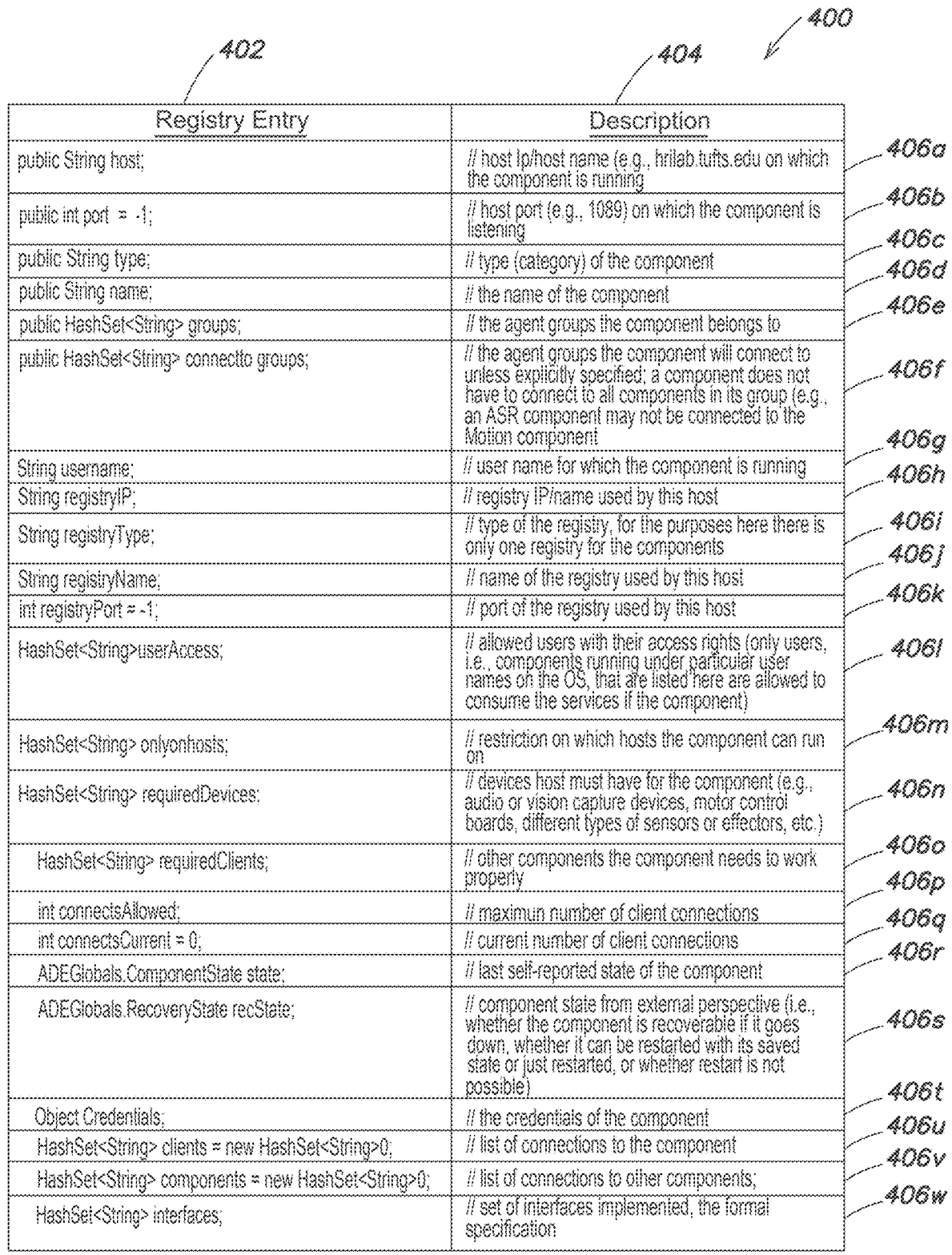
FIG. 4 is a schematic illustration of an example registry entry 400 for a functional component in accordance with one or more embodiments.

FIG. 4 is a schematic illustration of an example registry entry 400 for a functional component in accordance with one or more embodiments. The registry entry 400 may include a plurality of variable definitions for the functional component. FIG. 4 illustrates the registry entry 400 as a table having a first column 402 for the variable definitions, a second column 404 for descriptions of the variable definitions, and a plurality of rows 406a-x where each row 406 corresponds to a particular variable definition.

As noted, row 406x may include a formal specification of the set of interfaces or services implemented by the functional component. As an example, a "Humanoid" interface may consist of several component interfaces such as "HumanoidArmComponent", "HumanoidFaceComponent", "HumanoidHeadComponent", "PanTiltComponent", "SpeechProductionComponent", etc. and the "HumanoidArm" interface may consist of the following services:

```
/**
 * Move arm.
 * @param Right move right arm if true, else left arm
 * @param ePitch elbow pitch (0 = straight, bent = 90)
 * @param sYaw shoulder yaw (i.e., to side; 0 = down, 90 = out)
 * @param sPitch shoulder pitch (i.e., to front; 0 = down, 180 = up)
 * @param ePitSpeed elbow pitch speed
 * @param sYawSpeed shoulder yaw speed
 * @param sPitSpeed shoulder pitch speed
 * @return true
 */
    public boolean moveArm(boolean Right, int ePitch, int sYaw, int sPitch, int
ePitSpeed, int sYawSpeed, int sPitSpeed) throws RemoteException;
/**
 * Point at a location.
 * @param theta (right-left)
 * @param phi (up-down)
 * @return true
 */
    public boolean Pnt2Obj(double theta, double phi) throws RemoteException;
/**
 * Wave left hand.
 * @param n the number of waves.
 */
    public void waveLeftHand (int n) throws RemoteException;
/**
 * Wave right hand.
 * @param n the number of waves.
 */
    public void waveRightHand (int n) throws RemoteException;
```

Discovery Service

The discovery service 302 may be configured to discover functional components within an agent group that are available for sharing. The discovery service 302 may identify the types of functional components, their services, the agent hosting the functional component, the location of the agent in an environment, the hardware requirements of the functional component, and the availability of the functional components. The location of a functional component available for sharing may be important. For example, a home security agent may request access to a functional component operating a camera device at a particular location, e.g., in front of a house. In some embodiments, the discovery service 302 may also determine performance profiles and security requirements of functional components available for sharing.

The discovery service 302 may provide the availability of a providing component to a requesting agent, so that the services of the providing component can be consumed by the requesting agent when requested. This may include guarantees of availability in cases where services of the providing component are required within a particular time interval by the requesting agent, e.g., a robot agent requiring real time vision processing in order to detect the type of a rapidly approaching object. This may also include guarantees of performance and throughput (e.g., a guaranteed frame rate for a component processing visual information coming from a camera). In addition, the discovery service 302 may identify security provisions for access control to prevent unauthorized requests to a functional component available for sharing.

The discovery service 302 may index available functional components and their services in terms of the function of the services offered. The discovery service 302 may use meaningful functional descriptions, e.g., in some formal language that can express the functions performed by the component, so that functional components and their services can be discovered based on the functions offered, given the functional needs of the requesting agent. The discovery service may avoid using service names that do not give clear indications or formal specifications of the functionality of the functional component available for sharing.

When a functional component at a first agent is interested in a particular service or set of services offered by a functional component at a second agent, the component at the first agent may provide the discovery service 302 with a formal specification of the pre-conditions and post-conditions of the service that the component at the first agent intends to consume. For example, actions, such as move-to-object, grasp-object, move-to-relative, release-object, etc., may define a set of parameters and a set of pre- and post-conditions. Post-conditions may be used to identify one or more actions to accomplish a goal. Given an arbitrary goal, the action that has the goal as a post-condition may be executed to accomplish the goal. Post-conditions also may be used to determine the success of a goal. In addition, a GM/AM component may find a chain of tasks where the post-conditions of one task satisfy the pre-conditions of a next task of the chain. The discovery service 302 may first look up whether services that meet those constraints are known to the agent group and if so, whether they are running. For example, a component at a first agent might look for a component that can perform a visual search for an object of type T at location L such that if the search action is performed and there is an object of type T at location L, the post-condition is that the object was recognized. This may be represented as follows:

| | |
|---|---|
| at(o:t, l) | [comment: object O of type T is at location l] |
| <lookfor>(t)->b | [comment: operation performed for objects of type T returning b] |
| detected(o:t, l) | [comment: detected object O of type T at L] |

The discovery service 302 may then take the pre- and post-conditions and search for a service that satisfies them. For example, each component may advertise its services in terms of such pre- and post-conditions, which may be augmented by one or more "operating conditions", which have to hold true for the service to complete successfully as well as one or more "failure conditions", which will be true in different failure cases (e.g., for the vision processing component, a failure condition of <lookfor> might be that the image is black). In other words, searches for functional components and/or services that can be shared may be performed in terms of semantics specified by those functional components and/or services. The component consuming the service may then retrieve the service name, in the above case <lookfor>(t) where t is the data the service needs to perform properly. The consuming component may thus provide the type of object it wants to look for, initiating the search and object detection process in the called component. The called component may then return a Boolean value b=true when the operation is successful, or b=false otherwise.

By advertising the whole operation, it is possible for the discovery service 302 to look up services by their function (i.e., detected(o:t,l)), and not only their name (i.e., <lookfor>). Nonetheless, it should be understood that, in some embodiments, the discovery service 302 may perform lookups by service name This approach may be distinguished from other middleware layers, such as ROS or the Joint Architecture for Unmanned Systems (JAUS). For example, with the present disclosure, a planning component can load the above service description:

at(o:t,l)
   <lookfor>(t)→b
   detected(o:t,l)

as a "plan operator" that it may use for finding plans that result in actions that lead to a goal state. When the plan is executed, the <lookfor> operation is automatically performed in the remote called component that provides that service.

In some embodiments, the discovery service 302 may also track the location of agents that are running shared functional components.

Access Control Service

The access control service 304 may provide fine-grained access to services provided by shared functional components in order to determine whether a functional component offering services is authorized to provide its services to the requesting agent and/or component and, if so, which services the providing functional component is allowed to offer. Additionally, the access control service 304 may determine whether the requesting component is authorized to access the offering component's services. The access control service 304 may determine when and to what extent offering component services can be consumed, for example, when the offering component is part of different groups formed with different agents. The access control service 304 may also determine the extent to which the offering component's internal information can be shared among different service consumers, e.g., requesting agents.

Connection Service

The connection service 306 may be configured to establish, maintain, and tear down connections among agents sharing functional components. The connection service 306 may provide different forms of dynamic connections, including durative connections where service consumers repeatedly consume services, for example because they cannot function properly without them, as well as short-timed connections, such as "one-shot calls" where a service is only consumed once and no permanent connection is maintained. For durative connections, the connection service 306 may ensure re-connection in cases of errors to maintain the proper operation of the agents using the requested component. Moreover, if the service offering component is moved to a different computing environment or if it needs to hand off its services to another component of the same type with the same functional properties, the connection service 306 may provide dynamic re-connection for connected clients. In some embodiments, the connection service 306 may perform such reconnections in a way that respects requirements about geo-location, performance profiles, hardware requirements, and other functional requirements. In addition, the connection service 306 may notify functional components that registered interest in an offering functional component if it changes its state, such as by migrating to a new host, permanently ending its service, or spawning new functional components that take over its services.

Information and Data Routing Service

The information and data routing service 308 determines how to bridge heterogeneous network environments, such as Ethernet, Wi-Fi, 4/5G, Bluetooth, etc., to accommodate functional components that are located on network running different data communication protocols. For example, functional components may be located on mobile devices, such as moving robot agents, mobile phones, on LANs that are disposed behind firewalls, etc. For example, highly mobile platforms, such as robot agents, may move in and out of areas of wireless reception. The information and data routing service 308 may provide different ways of adhoc bridging of data communication networks to ensure access to services offered by shared functional components on such mobile platforms.

Notification Service

In some embodiments, functional components can register with the notification service 310 to be notified when a set of components with services meeting a formal specification becomes available or becomes unavailable to the agent group. For example, suppose a functional component is interested in vision processing services offered at a particular remote location, but there are currently no such components available in the system. The component can register with the notification service 310 to be notified when the remote vision services become available to the agent group. Moreover, the functional component can register with the notification service 310 to be notified when the service becomes unavailable. In this way, the functional component can take appropriate action, e.g., notify a human user that it can no longer perform its function. The notification service 302 may periodically poll the registry to determine if a new entry has been added for the desired service. The notification service 302 may also determine if an existing entry for a particular service has been deleted from the registry In addition, in some embodiments, functional components with the appropriate credentials can request through the notification service 310 that other components with a specific set of services be instantiated, if such components exist, in particular locations. The functional component can then consume the services provided by these other components when they are instantiated.

Naming Service

The naming service 312 may determine which agents and functional components belong to a given agent group, and may notify those agents and functional components that they are part of the given agent group. The naming service 312 may assign group identifiers (IDs) and notify the agents and functional components that are members of the agent group of the assigned IDs. The information and data routing service 308 may utilize these IDs when requesting services from shared functional components. For example, through the IDs assigned by the naming service, a speech recognition component that translates acoustic data streams into streams of recognized words will know which acoustic data packet goes with what agent group in order to route the recognized words to the correct requesting component. The naming service 312 thus allows agents and functional components to determine that they operate together as an agent group in the service of an agent. The naming service 312 may assign group IDs, which can be used to determine how to route information flow through distributed heterogeneous functional components that may not otherwise be connected, e.g., through a sequence of "one-shot calls" where the routing may not be based on established connections, but rather on the discovery of available components on an as-needed basis.

Referring again to FIG. 2, in some embodiments, one or more of the functional components 204-210 may be given credentials. The credentials may be checked by the component sharing layer 300 in response to a request from one of the functional components 204-210 for services from a functional component of another agent. If the credentials pass, the component sharing layer 300 may establish a connection with the functional component of the other agent. In some embodiments, the credentials may be used to establish a secure connection with the functional component of the other agent. Credentials may be passed to the components on startup by the middleware. The components may register their credentials with the access control service 304. Then, for the lifetime of a given component, its credentials may be passed along with any service request to other components. The access control service 304 associated with these other components can check the credentials against the list of components authorized to consume its services.

In some embodiments, the component sharing layer 300 may maintain state information regarding connections with functional components at other agents. The component sharing layer 300 may utilize the state information should a first functional component at a first agent that has a connection with a second functional component at a second agent fail and/or be replaced by some other functional component at the first agent. The state information may include the identifiers of the connected components, their credentials, the components' physical locations in the world, any constraints on allowable locations, the agent group to which the components belong, and the services consumed by the first component and/or agent. Should a temporary failure of the second component occur, the middleware may attempt to restart the failed component. If the failed component cannot be restarted, the middleware may attempt to relocate the component to another allowable location, for example on a different host, and restart it there, e.g., on the new host. While the second component is unavailable, the first component may either wait for it to be restarted, or it may request to be connected to another, e.g., a third, component that offers the same services and that satisfies the constraints requested from the first component, such as a particular physical location.

In some embodiments, one or more of the functional components 204-210 may include methods for handling shared functional components that become unavailable whether temporarily or permanently. One or more of the functional components 204-210 also may include methods for handling novel components that become available while an agent is on-line and/or performing some task or goal. For example, suppose a novel task planning component becomes available that could solve a planning problem faced by a first agent. The new component may register with the middleware's discovery service 302 providing its services together with formal, e.g., logical, descriptions of the requirements that must be met to use the services, e.g., "pre-conditions", and the results after using the service, e.g., "post-conditions". In addition, the new component may register the authorized users of its services in terms of identifiers, agent groups, and/or logical descriptions, and one or more availability constraints. Such dynamic connections with novel components may significantly improve the operation of existing agents as they do not have to be stopped and restarted when they receive upgraded services, but can continue to operate.

In some embodiments, the discovery service 302 may pass agent group IDs into one or more functional components, e.g., on start-up. For example, agent group IDs may be passed into a GM/AM component, which may then request connections to at least some if not all of the functional components of the agent group. Furthermore, the notification service 310 may notify a functional component, e.g., the GM/AM component at a first agent, when a new functional component at a second agent becomes available for sharing. This allows the first agent to dynamically restructure its architecture, for example to go from a non-sharing context to a sharing context, at least with respect to the services provided by the new functional component.

The component sharing layer 300 may include techniques for keeping track among multiple functional components that are each requesting services from a given functional component at another device. For example, each functional component may maintain a list of other components currently connected to it and the services currently being consumed by the other components. Each functional component may also maintain a list of connections to other components it itself requires in order to provide its services. For example, an itinerary planning component might need access to databases of plane and train schedules in order to plan itineraries.

In addition, the component sharing layer 300 may utilize identifiers (IDs) to organize functional components into component groups. Component groups may be used to define agent architectures. For example, all perceptual components of an agent architecture A could be named "A-perceptual", and all action-based components of the agent architecture A could be named "A-action", etc. Together, the whole architecture of agent architecture A can be broken down into these possibly overlapping subsets, e.g., one component can be part of multiple component groups, such that the union of all component groups with the prefix "A-" contains all functional components in A's agent architecture. The fact that a single component can be part of multiple component groups allows for sharing components across agents. For example, the A-knowledge group may consist of a knowledge database KB1 component together with a reasoner component R1. Both of theses components may be part of B-knowledge, which may be a group part of the definition of B's agent architecture. Note that R1 and KB1 denote concrete instances of the database and reasoner components, respectively, while the component groups for A and B denote ways to characterize A's and B's agent architecture. It is possible to both specify an agent architecture in terms of component types, e.g., a type of reasoner R, as well as instances, e.g., reasoner R1. The former may just specify an architecture diagram, while the latter may specify particular configurations, including the sharing of particular instances of components. Similarly, a deep neural network (DNN) consisting of multiple layers where different layers are implemented in different components may be used to share layers among different agents, e.g., the processing layers in a visual system.

The functional components included in an agent architecture may perform one of three roles: interaction with the outside world, e.g., sensing and actuating, grounding information about the outside world in knowledge representations, such as knowledge bases, and reasoning about that grounded knowledge. To intelligently interact with the world, an agent may need all of these types of components, and sharing the different types of components may have different effects on the behavior of the agent.

The minimum required configuration of a DIARC agent architecture may be a core set of reasoning components and the set of reasoning and grounding components that allow the agent to interact with the world in the fashion intended by the user. The core set of reasoning components may include a Belief Component and the Goal/Action Management component. The Belief Component may store the agent's knowledge about the world. The information stored in the Belief Component may be grounded, e.g., connected to perceptions and actions, in such a way that the agent can use it to interact with the outside world. This information can be provided to the agent by a user, such as a human, and/or derived from information from the outside world. Notably, there is a distinction between this type of cognitively grounded information that an agent uses to reason, and other information that the components of the agent may contain, which may not be part of the agent's cognition.

The Goal/Action Management component may perform two distinct roles, which may be inherently dependent on each other. The Goal/Action Management component may receive goal descriptions from other functional components, including components that interact with users, and may determine what the agent should do. The Goal/Action Manager may use information about the state of the world from the Belief Component and its own knowledge of other existing goals, as well as inference mechanisms, such as priority judgments, ethical judgments, etc., to determine a desired goal state. If this goal state is made true, the goal is satisfied. The Goal/Action Management component may determine how this goal state is achieved. The Goal/Action Manager may select and execute appropriate actions to achieve the desired goal state. These actions can be executed by functional components of the agent that affect the outside world.

The Goal/Action Management component may be unique in that, in addition to reasoning about what the agent should do and how it should do it, it may also ground the cognitive level actions the agent can reason about. These actions may come in two forms: primitive actions, which may map to services offered by components in the agent architecture that can interact with the outside world, and action scripts which may combine sequences of primitive actions and reasoning. Actions can generate additional sub-goals which may be reasoned about by the Goal/Action Manager component in order to determine intermediate goal states that may be required to achieve the desired goal state of the original goal.

The Goal/Action Manager component may compile a database of all primitive actions advertised by functional components in the agent architecture. The Goal/Action Manager component also may store a representation of the action, its pre-, operating and post-conditions, i.e., the state of the world required before and during its execution, and the effects the execution of the action has on the state of the world. If the advertising component of an action is a member of a named agent group, that action may only be available to be executed by that agent. Otherwise, the action may be available to be executed by all actors. Information about valid actors may also be also stored in the action's entry in the action database. Action scripts may be composed of a sequence of primitive actions, other scripts, and a set of predefined operations on those actions. An action that is represented by an action script may be reasoned about in the same way as a primitive action. However, execution of a script may not be reducible to the consumption of a single service in another component. Instead, the execution of a script may lead to the submission of sub-goals, which may result in further reasoning and in the execution of other actions.

On their own, the Belief Component and the Goal/Action Management Component may not be sufficient for building a functional agent. Other components may be required to interact with the outside world, and to ground those interactions in terms that the agent can reason about. Interaction components may interact with the outside world in two fashions: they may sense the world through some modality, e.g., sound, vision, location, etc., and/or they may affect the world in some fashion, e.g., speaking, moving, etc. These components may gather information from the world for use internally in the agent and/or manipulate the world on the behalf of the agent. Grounding components may convert information about the outside world to information that the agent can reason about, and translate information that the agent can reason about to a form that can be used to affect the outside world. Additionally, other reasoning components can be utilized to perform more specific reasoning about goals and how goal states can be achieved, e.g., task planners, motion planners, etc.

In some embodiments, the middleware, the functional components, the component sharing layer, and/or its services may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, one or more of the middleware, the functional components, the component sharing layer, and/or its services may be implemented in hardware, for example through hardware registers and combinational logic configured and arranged to produce sequential logic circuits that implement the methods described herein, for example on one or more Complex Programmable Logic Devices (CPLDs), Field Programmable Gate Arrays (FPGAs), Application Specific Integrated Circuits (ASICs), etc. In other embodiments, various combinations of software and hardware, including firmware, may be utilized to implement the systems and methods of the present disclosure.

Flow Diagrams

The following flow diagrams are for illustrative purposes only. In some embodiments, one or more of the illustrated steps may be omitted, additional steps may be added, the order of the illustrated steps may be changed, one or more illustrated steps may be subdivided into multiple steps, multiple illustrated steps may be combined into a single step, and/or one or more of the flow diagrams may be separated into multiple, distinct flow diagrams.

Figure 5A:
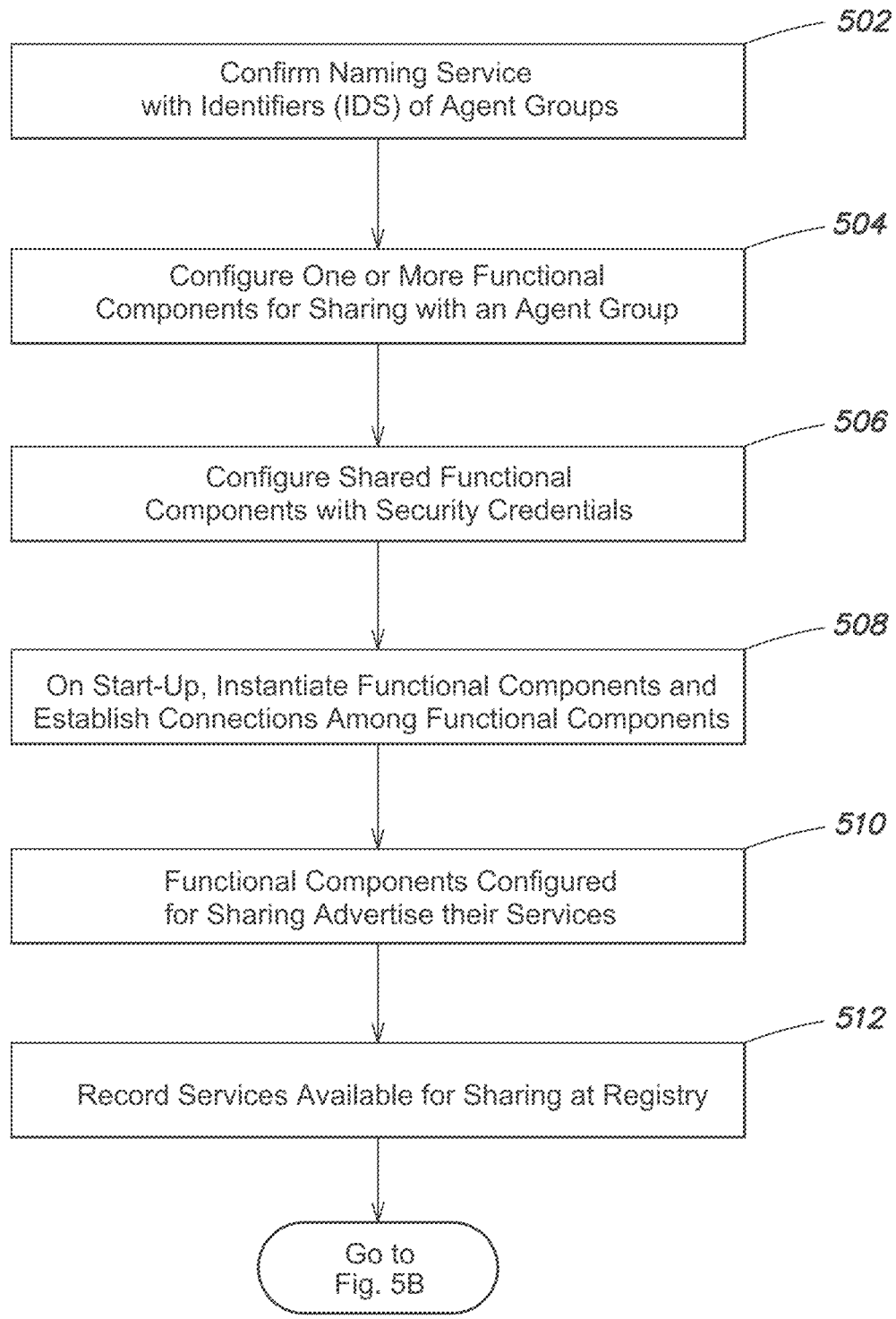
FIGS. 5A-B are partial views of a flow diagram of an example method for setting up an agent for sharing functional components in accordance with one or more embodiments.
Figure 5B:
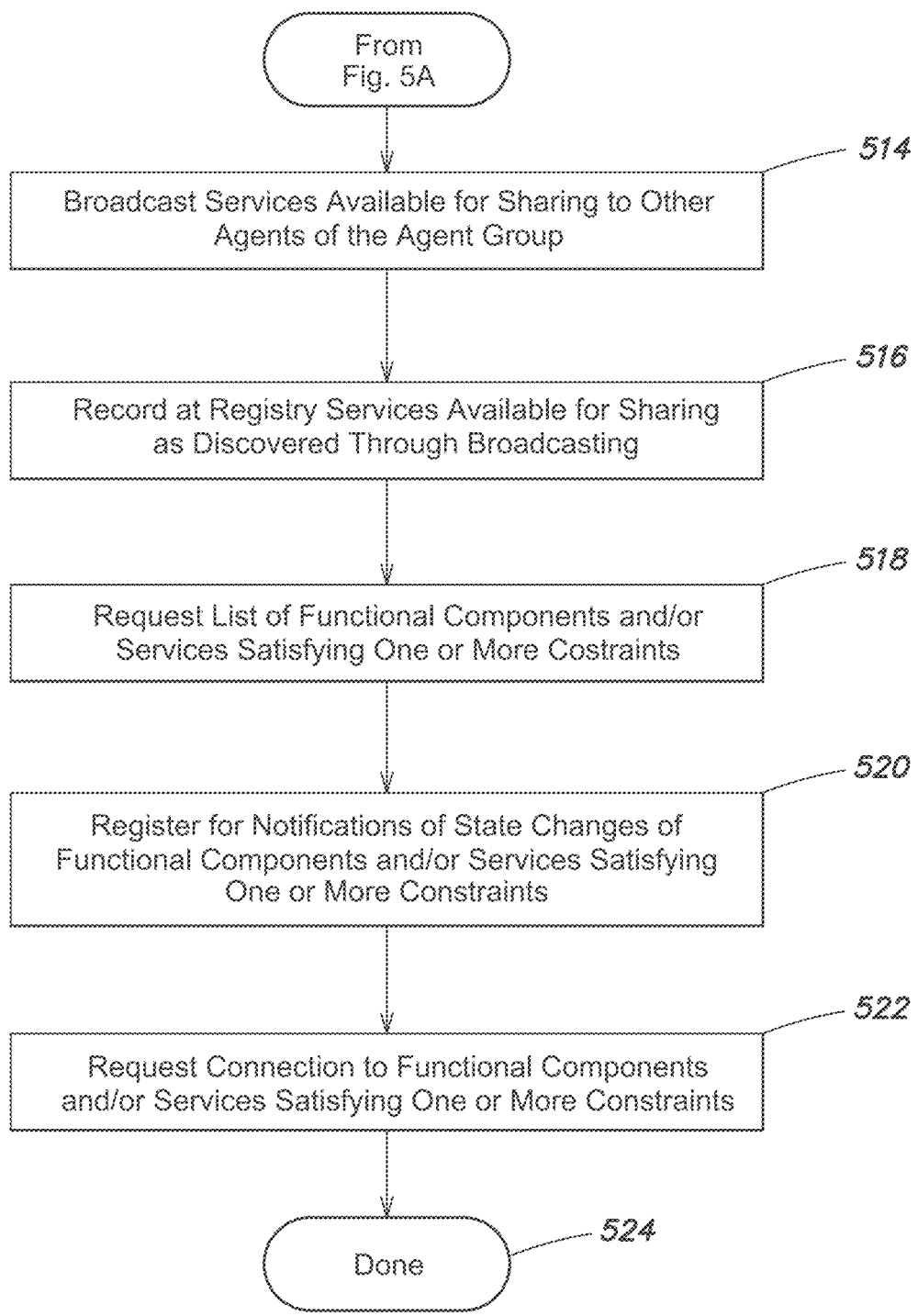

FIGS. 5A-B are partial views of a flow diagram of an example method for setting up an agent for sharing functional components in accordance with one or more embodiments. The naming service 312 of a component sharing layer 300 of an agent may be configured with identifiers (IDs) of the one or more agent groups of which the agent is a member, as indicated at step 502. In some embodiments, a user, such as a human administrator of an agent group, may configure the naming service 312 with the agent group IDs. One or more functional components and/or services of an agent may be configured to be shared within an agent group, as indicated at step 504 In some embodiments, a user, such as a human administrator of the agent group, may configure the functional components. For example, the set a sharing parameter associated with the one or more functional components to predefined value, e.g., True if the functional component is to be shared, otherwise False. The agent and/or the functional components designated as being shared within the agent group may be assigned security credentials, as indicated at step 506. For example, a user, such as the human administrator of the agent group may assign the security credentials to the agent and/or the components designated available for sharing.

In some embodiments, sharing policies may also be defined and associated with one or more agent groups. The sharing policies may indicate how components are assigned to agent groups and access permissions to shared functional components.

On start-up of the agent, the middleware 202 may instantiate the functional components included in the agent, as indicated at step 508. The middleware 202 may also establish communication channels/links between the functional components, as also indicated at step 508. The functional components included in the middleware 202 that are configured for sharing may advertise the services offered by those functional component, as indicated at step 510. For example, the functional components may issue API calls to the discovery service 302 of the agent with an offer of the services provided by the functional components. In some embodiments, the offer of services may be made in terms of a semantic description of the services. For example, for each service, the offer may be in terms of the pre-conditions and the post-conditions of a task that can be performed by the functional component or one of its services. Alternatively or additionally, the offer may be made in terms of the name of the service and/or the name of the type of service. The discovery service 302 may record the offers in entries 400 of the registry 316, as indicated at step 512. In some embodiments, an entry 400 of the registry 316 may include one or more of:

agent group ID,
name of robot agent at which functional component is instantiated,
physical location of robot agent, or
semantic description of the service, i.e., the pre-conditions, operating conditions, failure conditions, and post-conditions.

In addition, the discovery service 302 may broadcast the offers of the functional components at its agent to the other agents of the agent group, as indicated at step 514 (FIG. 5B). In response to receiving broadcasts of available shared services and/or functional components, the discovery services associated with the other agents of the agent group may add entries to their registries for these advertised services by the other agents of the agent group, as indicated at step 516. Functional components may request a list of functional components and/or services meeting one or more constraints specified by the functional components, as indicated at step 518. The functional components may then register to be notified about state changes of the components and/or services included on the list, as indicated at step 520. Examples of state changes for which a functional component may register to be notified include when a component becomes available in a specific geolocation, when a particular type of component becomes unavailable, such as the Automatic Speech Recognition (ASR) component crashing, etc. Alternatively or additionally to registering for notifications of state changes, the functional components may request connections to one or more of the components and/or services satisfying the one or more constraints, as indicated at step 522. At this point, the set-up phase for component sharing may be complete, as indicated at Done step 524.

Figure 6A:
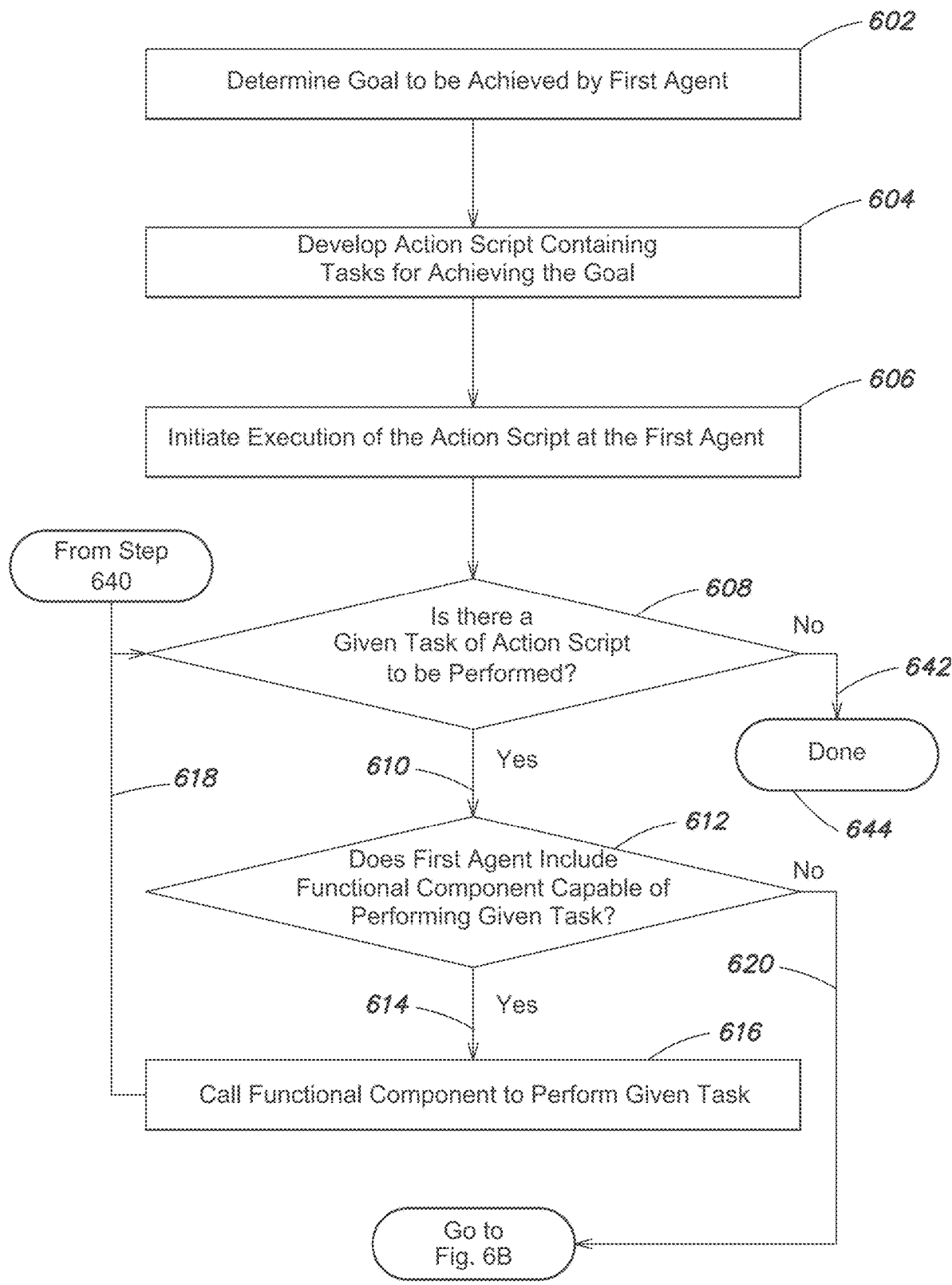
FIGS. 6A-C are partial views of a flow diagram of an example method for sharing functional components and/or services among agents of an agent group in accordance with one or more embodiments.
Figure 6B:
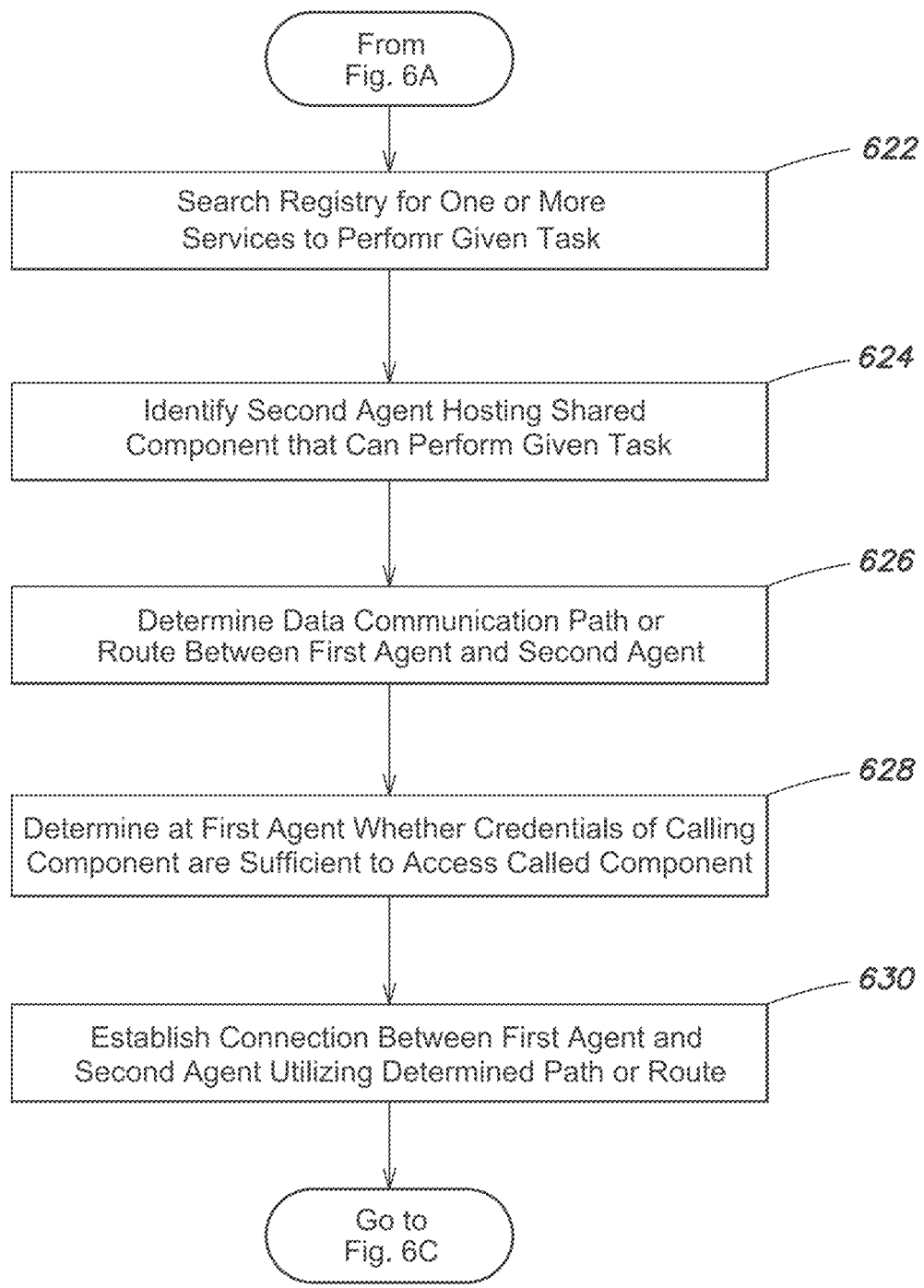
Figure 6C:
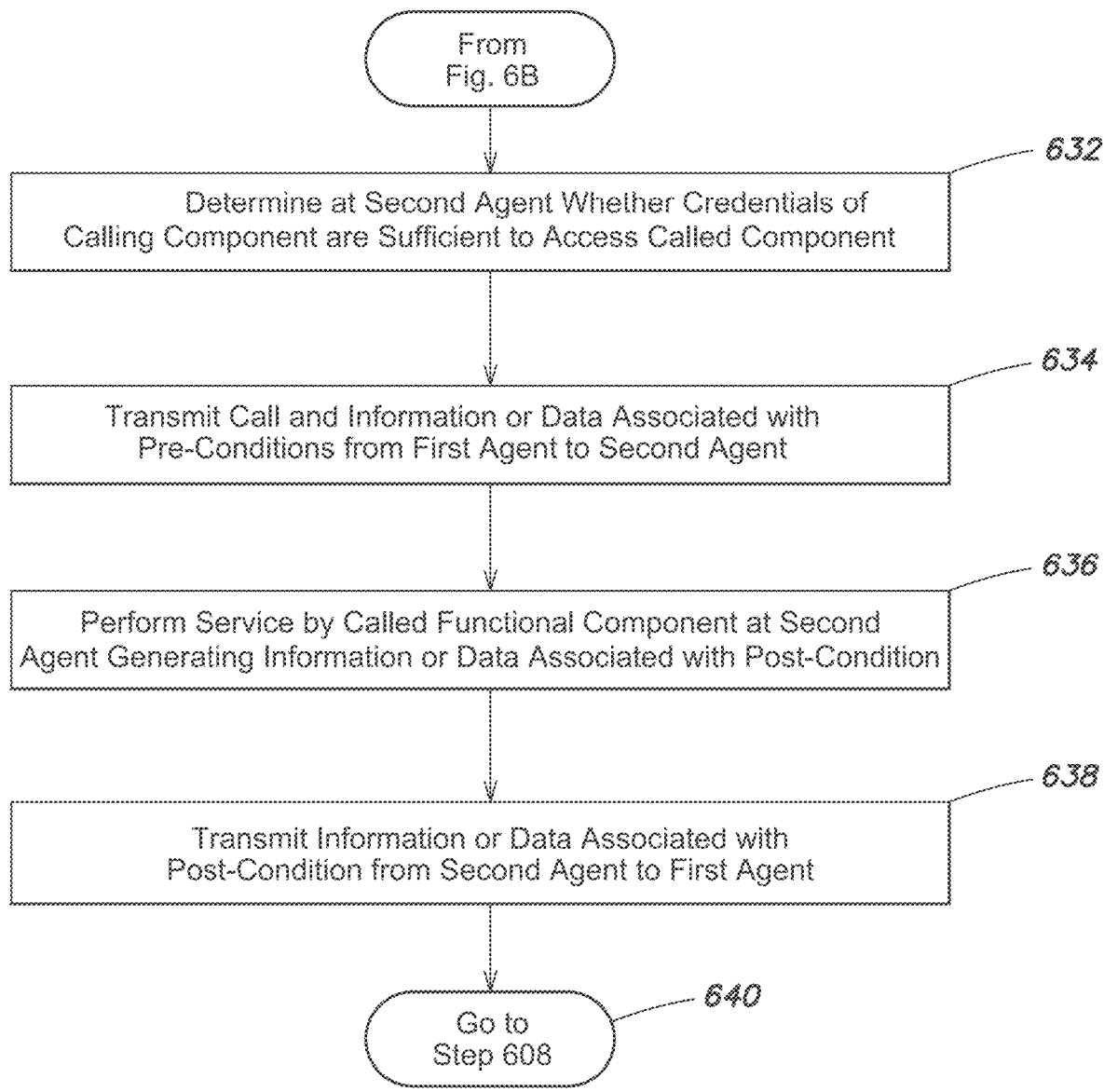

FIGS. 6A-C are partial views of a flow diagram of an example method for sharing functional components and/or services among agents of an agent group in accordance with one or more embodiments. A Goal Manager/Action Manager (GM/AM) functional component, which may perform planning operations, of a first agent of the agent group may determine a goal to be achieved, e.g., in response to a command or instruction from a human instructor, as indicated at step 602. The GM/AM component at the first agent may develop one or more action scripts for achieving the goal, as indicated at step 604. The one or more action scripts may include a series of tasks. Tasks, moreover, may be performed by a given functional component calling one or more methods. In some embodiments, the tasks and/or methods may be specified in terms of pre-conditions, operating conditions, failure conditions, and post-conditions. The GM/AM component may initiate execution of the action script, as indicated at step 606. The GM/AM component may determine whether there is an task of the action that is to be performed, as indicated at decision step 608. If so, the middleware 202 may determine whether there is a functional component at the agent that can perform the given task, as indicated by Yes arrow 610 leading to decision step 612.

If the middleware 202 includes a functional component that can perform the task, then the middleware 202 may call that functional component to perform the task, as indicated by Yes arrow 614 leading to step 616. Processing may then return (or continue in parallel) to decision step 608, as indicated by arrow 618. In some embodiments, execution of the action script involves the middleware of the first agent calling functional components to perform the tasks of the action script, the middleware may append data generated by a first functional component (the "calling" functional component) as a result of having performed of a first task with the call to a second functional component (the "called" functional component) to perform a next task of an action script, task schedule, plan or other form of scheduling activities or actions. The functional components, in turn, may call one or more methods to perform a task and the one or more methods may be performed by other functional components. As described, as each task of the action script is reached, the middleware 202 at the first agent may determine whether the first agent itself includes an instantiated functional component that is capable of performing the task, e.g., whether the first agent itself includes an instantiation of the called functional component. If so, the middleware 202 may forward the call from the calling component to the called component, which may then performs the task, and the process may proceed to the next task in the action script.

Returning to decision step 612, if the first agent does not include an instantiated functional component that can perform the current task, the registry service 314 and/or the discovery service 302 may search the registry 316 to see whether there is an entry 400 for a functional component somewhere in the agent group that can perform the current task, as indicated by No arrow 620 leading to step 622 (FIG. 6B). For example, the discovery service 302 and/or the component requesting the service may call the registry service 314 using an API, which may be represented as:

```
public ArrayList<String> requestLocalComponentList(
    String uid, // The username
    String upw, // The password
    String[ ][ ] constraints // The constraints to be met by the component
    ) throws AccessControlException, RemoteException;
```

The registry service 314 may check the username and password upon initial registration. The constraints may include the type of component, e.g., an ASR component, the services offered by the component, e.g., in terms of pre-conditions, operating conditions, failure conditions, and post-conditions, the agent group, the host the components is to be running on, and the geolocation of the host, among other factors. For example, the registry service 314 and/or the discovery service 302 may search the registry 316 for one or more functional components whose advertised service has pre-conditions and post-conditions that match the pre-conditions and post-conditions of the current task that cannot be performed by any of the functional components instantiated at the first agent itself.

The registry service 314 and/or the discovery service 302 may attempt to match the constraints from the constraint list against the properties of a component stored in the registry 316. For conjunctions of constraints, the registry service 314 and/or the discovery service 302 may attempt to match all of the constraints, and only if that succeeds, it will include a component in the list. For disjunctions of constraints, the registry service 314 and/or the discovery service 302 only one of the constraints have be met by a component in the registry 316.

For example, the following constraint set requests all components implementing the vision interface that either run on IP address <ipadd> and are available or that are located at longitude <long> and latitude <lat> regardless of availability:

```
[or [and [isa type "vision"][runson IP <ipadd>][isavailable true]
    [and [isa type "vision"]{longitude <long> ][latitude <lat>]]]
```

The registry service 314 and/or the discovery service 302 at the first agent may identify and return a list of functional components and/or services, based on its search of the registry 316, such a functional component that is running at or may be instantiated at a second agent within the agent group, as indicated at step 624.

The information and data routing service 308 may determine a data communication path or route between the first and second agents, as indicated at step 626. For example, the information and data routing service 308 may determine whether the first agent can directly connect to the second agent, for example if the two agents are on the same Local Area Network (LAN), have a direct Bluetooth or Infrared (IR) connection, etc., or whether data communications between the first and second robot agents need to pass through and be forwarded by one or more intermediary agents of the agent group. The access control service 304 may determine whether the credentials of the calling component at the first agent are sufficient to access a shared component of another agent of the agent group, as indicated at step 628. Assuming the calling component and/or the first agent has the credentials to access the shared component, the connection service 306 may establish a data communication connection between the first and second agents, e.g., utilizing the route determined by the information and data routing service 308, as indicated at step 630. In some embodiments, the connection may be between the middleware layers 202 at the two agents.

In some embodiments, the access control service 304 at the second agent may determine whether the credentials of the first agent and/or the calling component are sufficient for granting access to the called functional component at the second agent, as indicated at step 632 (FIG. 6C). For example, the request for a connection to the called component may include the calling component's username and password. If the called component is available, it may accept the connection. The called component may also check the credentials of the calling component directly every time a service is consumed to ensure that services are only consumed by authorized users and not users who may have accidentally connected. In other embodiments, passwords may be systematically modified on both sides after each service is consumed. If so, the connection service 306 at the first agent may transmit a call for service and any data needed to perform the call, such as data associated with the pre-conditions, from the calling component to the second agent utilizing the established data communication connection, as indicated at step 634. As noted, in some embodiments, the call and data may be routed through one or more the intermediary agents of the agent group.

The called component at the second agent may perform the task and/or service generating results or outputs, such as data associated with the post-conditions, as indicated at step 636. The connection service 306 at the second agent may transmit the results, e.g., the data associated with the post-conditions, as generated by the called component to the first agent and/or the calling component utilizing the established data communication connection, as indicated at step 638.

Processing may then return to decision step 608 (FIG. 6A) as indicated by Go To step 640 (FIG. 6C). This process may be repeated until all of the tasks of the action script are completed. At that point, processing may be complete, as indicated by No arrow 642 leading to Done block 644.

It should be understood that, in some embodiments, called, e.g., remote, services may be consumed by a calling GM/AM component or through scripts. For example, access to shared services of a remote functional component can be made directly via one or more "call( . . . )" methods by a calling functional component. For example, the NLP component 208 may call a parsing component that can parse a complex sentence that the NLP component 208 cannot parse itself. In another example, a text generation component may call a speech synthesizer to generate an audio file that can subsequently be played on the calling agent's speakers in case a person is located by the calling agent and will be able to listen to the audio message. That is, calls to components within an agent group and outside of the agent group can also be made at a run-time phase either via an established connection to a second component offering the services, or via a one-shot call based on the semantic description of the service requested, where the middleware 202 may determine, based on the semantic description, where to forward the request to and which shared component should offer and/or perform the service.

Agent Group

Referring again to FIG. 1, suppose that each robot agent 102 and 103 includes the following functional components: automatic speech recognition (ASR) component, vision component, and motion component. Suppose further that the intelligent agent 104 includes a dialog manager (DM) component and the intelligent agent 105 includes a natural language unit (NLU) component, a goal manager/action manager (GM/AM) component, and a belief (BEL) component. Suppose the robot agent 102 is assigned the name Shafer and the robot agent 103 is assigned the name Dempster, and the name of the human instructor 106 is Ann.

Figure 7:
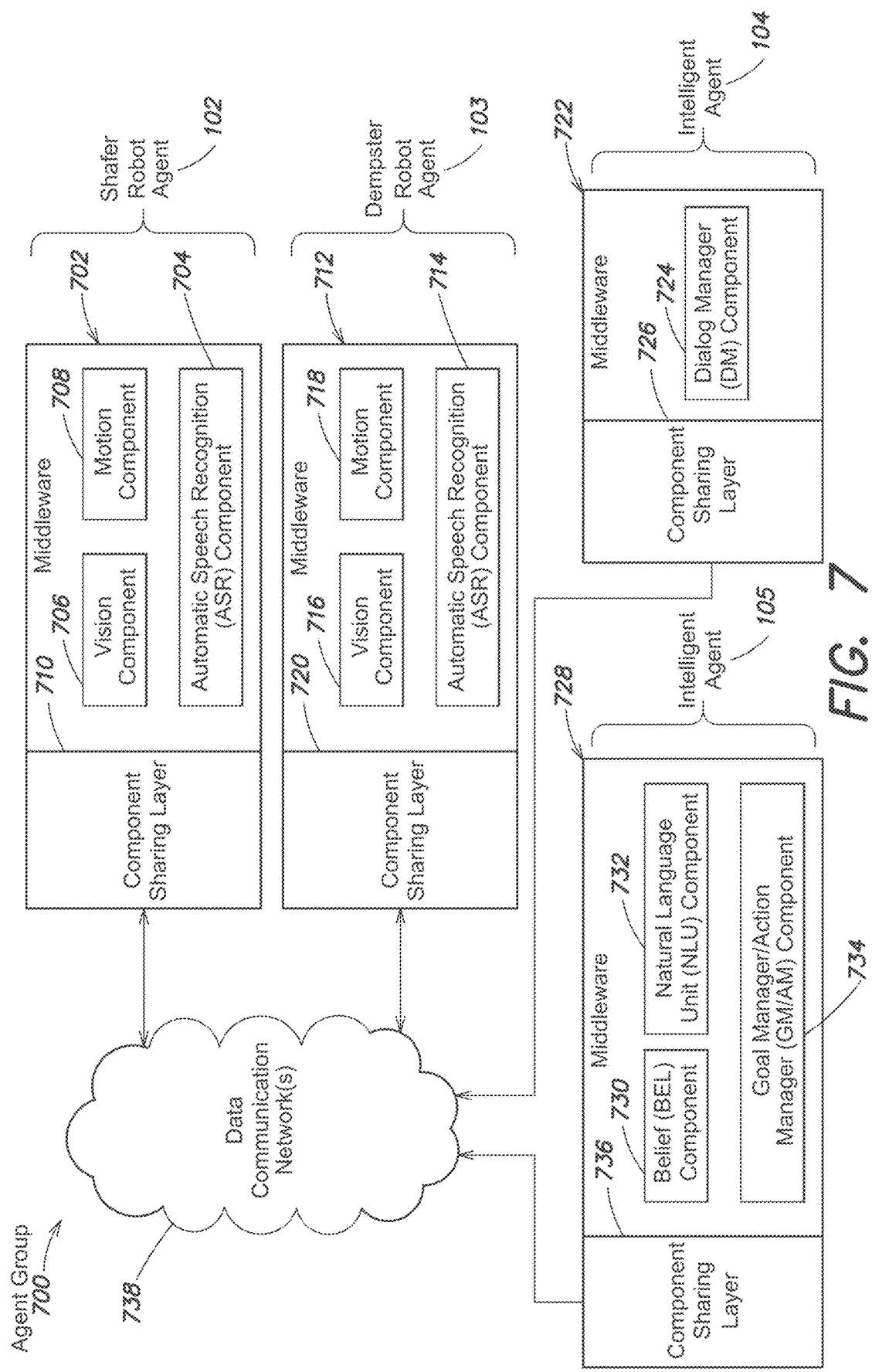
FIG. 7 is a functional illustration of an example agent group in accordance with one or more embodiments of the present disclosure.

FIG. 7 is a functional illustration of an example agent group 700 in accordance with one or more embodiments of the present disclosure. The agent group 700 includes the Shafer robot agent 102, the Dempster robot agent 103, and the two intelligent agents 104 and 105. As described, the Shafer robot agent 102 includes middleware 702 that includes an ASR component 704, a vision component 706, and a motion component 708. The middleware 702 is also configured to include a component sharing layer 710. The Dempster robot agent 103 similarly includes middleware 712 that includes an ASR component 714, a vision component 716, and a motion component 718. The middleware 712 is also configured to include a component sharing layer 720. The intelligent agent 104 includes middleware 722 that includes a DM component 724. The middleware 722 of the intelligent agent 104 is also configured to include a component sharing layer 726. The intelligent agent 105 includes middleware 728 that includes a BEL component 730, an NLU component 732, and a GM/AM component 734. The middleware 728 is also configured to include a component sharing layer 736. The Shafer robot agent 102, the Dempster robot agent 103, and the two intelligent agents 104 and 105 are in communicating relationship through one or more data communication networks indicated at 738.

In an embodiment, the middleware layers 702, 712, 722, and 728 may be implemented in an Agent Development Environment (ADE). The ADE middleware is described at least in part in V. Andronache et al. *ADE—An Architecture Development Environment for Virtual and Robotic Agents* (2005), which is hereby incorporated by reference in its entirety.

Component Sharing Example

On startup of the Dempster robot agent 103, at least some of its functional components initially register with the middleware's naming service which allows the middleware to discover the component's capabilities, services, constraints, host Internet Protocol (IP) address, agent group, security access, and other aspects or attributes of the component. Once registered, authorized functional components can request connections to other functional components whose services they require, which may be done by contacting the discovery service using the API call:

requestConnection(ID,credentials,constraint list)

where

ID is the requesting component's middleware identifier, credentials are the security parameters that the remote component will check to allow a connection, and constraints is a list of the formal specifications of the constraints on the type of component to which the connection is requested.

The constraints list may contain the same parameters as those used by functional components during startup when they initially register. For example, the ASR component 714 may be configured to issue a connection request to the component sharing layer 710 to connect to a functional component of the type Interface:NLU. The request may specifically include "NLU" together with its credentials and the agent group "Dempster" in the request. In response to the request, a registry of the component sharing layer 720 may locate the NLU component 732 of the intelligent agent 105 as satisfying the request. The middleware ID of the NLU component 732 may be provided to the ASR component 714 of the Dempster robot agent 103, and a connection between the ASR component 714 at the Dempster robot agent 103 and the NLU component 732 at the intelligent agent 105 may be established by the respective component sharing layers 720 and 736. In a Java implementation of the ADE middleware this may be accomplished with a Java Remote Method Invocation (RMI) and a remote object reference to the remote component. In another RMI-less implementation of the ADE middleware, this may be accomplished by opening a direct peer-to-peer socket connection between the two components.

Suppose the human instructor Ann 105 says to the Dempster robot agent 103 "Tell Shafer to walk forward". The Dempster robot agent 103 may include signal processing hardware, such as a microphone, Analog to Digital (A/D) converters, etc., and may convert the received audio into text, and sends the text as well as identifiers (IDs) assigned to the speaker, i.e., Ann, and the listener, i.e., the Dempster robot agent 103, to the NLU component 732 via the component sharing layer 720 with a request to interpret the text. The component sharing layer 720 may append the ID for the Dempster robot agent 103 to the request sent to the NLU component 724, and route the request including the text to the NLU component 724, e.g., through the one or more data communication networks 730.

The component sharing layer 736 of the intelligent agent 105 may receive the request, and may pass it to the NLU component 732. The NLU component 724 may process the text, and may generate the following representation of the semantics:

want(Ann,(do(tell(Dempster,Shafer,(walk(Shafer,forward))))))

When the NLU component 732 was first instantiated, it may request a connection to a component of type Interface:DM. The registry maintained by the component sharing layer 736 may return the middleware ID of the DM component 724 at the intelligent agent 104. A connection between the NLU component 732 at the intelligent agent 105 may be established with the DM component 724 at the intelligent agent 104.

The NLU component 732 may pass these semantics to the DM component 724. On startup, the DM component 724 at the intelligent agent 104 may request connections to components of types Interface:BEL and Interface:GM/AM. The registry maintained by the component sharing layer 726 may return the middleware ID of the BEL component 730 at the intelligent agent 105 and the middleware ID of the GM/AM component 734 at the intelligent agent 105. Connections between the DM component 724 at the intelligent agent 104 and the BEL and GM/AM components 730 and 734 at the intelligent agent 105 may be established.

Assuming there are no other ongoing dialogues, the semantics may be asserted to the BEL component 730, and the ID of the speaker, the ID of the listener, and semantics generated by the NLU component 732 may be stored by the DM component 724 in a record of the history of the current dialogue. The DM component 724 may also submit goal information resulting from the semantics to the GM/AM component 734 for subsequent execution, and may submit a request to the GM/AM component 734 to be notified of any goals that match the information sent to the BEL component 730. If such a goal is found by the GM/AM component 734, the GM/AM component 734 may report this goal to the DM component 724. The DM component 724 may monitor the reported goal until its completion.

When the BEL component 730 receives new information that the GM/AM component 734 cares about, such as facts or changes in knowledge that might trigger the execution of a goal, it may send a message to the GM/AM component 734. When the GM/AM component 734 receives this message, it may send a return message to update information in the BEL component 730, such as adding new facts and goals, or retracting existing facts and goals. When new information is added to the BEL component 730, the GM/AM component 734 may inspect it, and may use its rules to determine if there is a new goal to be executed. In this case, the GM/AM component 734 may determine that a new goal is to be executed, and the new goal may be represented as:

do(tell(Dempster,Shafer,(walk(Shafer,forward)))

The GM/AM component 734 may determine how this goal can be achieved. The GM/AM component 734 may select its "tell(X,Y,Z)" action script, which is not bound to any actor, where X is the addressee, Y is the executing agent and Z is the goal predicate that the speaker wants agent X to relay to agent Y. The first step of the tell action script may result in the submission of the goal predicate Z. When this step is executed, the GM/AM component 734 may receive a new subgoal predicate Z, "walk(Shafer,forward)", and the GM/AM component 730 may determine how its goal state can be reached. The GM/AM component 734 may select its "walk(X,Y)" action script, which may be executed for the Shafer robot agent 102 where X is the actor that is to perform the walk action and Y is the direction, e.g., forward, backward, left, or right.

In addition to the currently submitted goals, at start-up, the robot agents 102 and 103 may be configured to have persistent goals to look for obstacles. These goals may be represented as "checkForObstacles(Dempster)" and "checkForObstacles(Shafer)". To satisfy these goals, the GM/AM component 734 may execute scripts that continually call obstacle detection primitive actions provided by the vision components 706 and 716 the Shafer robot agent 102 and the Dempster robot agent 103.

The BEL component 730 at the intelligent agent 105 may be updated by asserting, i.e., adding to the knowledge base, or retracting, i.e., removing from the knowledge base, the predicates "seesObstacle(Shafer)" and "seesObstacle(Dempster)". The connection between the GM/AM component 734 of the intelligent agent 105 and the Shafer robot agent 102 is different than the connection used so far, which is between the GM/AM component 734 and the Dempster robot agent 103. On startup, the Shafer robot agent 102 may advertise a set of services which have been annotated by the user to be "actions", i.e., actions that are executable on a robot platform in the real world. These may be distinguished from mere software services, such as services for recognizing objects in images, as they may have different types of constraints, such as requiring single execution and do not allow for parallel consumption. As with the other services of all registered components, the middleware may track all such advertised actions as well as the agent group of the functional component which offers those actions. This allows functional components to request a list of all actions robotic platforms within an agent group can perform, and these actions can subsequently be used by different functional components for their purposes. For example, a planning component may generate planning operators for each executable action, a natural language generation component might associate different action verbs with each executable action, a BEL component might have explicit knowledge stored about each executable action, etc. When the GM/AM component 734 of the intelligent agent 105 starts, it may record in its database all executable actions that the middleware registry is tracking, the middleware ID of the functional component that is advertising each, and if that functional component is in an agent group the name of the agent group, which may be used to restrict execution of that action to only actors in that agent group. In this way, the architecture of the agent group 700 including the component sharing layers 710, 720, 726, and 736 can access actions by their architecture ID and, when it is time for them to be executed, the GM/AM component 734 may look up the appropriate middleware ID and perform a one-time call of that method on the appropriate functional component. For example, the GM/AM component 734 may use the information about the component and its services it received when initially querying the middleware for all available executable actions and automatically connects a particular action, such as "walk" to the service in a remote component that offers it. The GM/AM component 734 may automatically use the first action argument, which refers to the actor supposed to carry out the action, as a way to identify the component on which to consume the service. This way, if there are multiple functional components offering the service, e.g., multiple robots as is the case in this example, the action is executed on the appropriate remote component running on the correct robot.

The "walk(X,Y)" action script is initially not bound to any specific actor. In this example, it is executed with the actor (X) being the Shafer robot agent 102. The action script may query the BEL component 730 for the "seesObstacle(X)" predicate. If the "seesObstacle(X)" predicate is not present in the BEL component 730, the "walk(X,Y)" action script may call the "moveTo(Y)" primitive action for the actor X, e.g., the Shafer robot agent 102. The GM/AM component 734 may use the robot name for the Shafer robot agent 102 to lookup the appropriate action. When the "moveTo(Y)" action script is found, the GM/AM component 734 may use the stored binding to execute the action script by calling the motion component 708 of the Shafer robot agent 102. The motion component running on the Shafer robot agent 102 executes the "moveTo(Y)" action, which is a service it offers, and the Shafer robot agent 102 moves forward. The "walk(X,Y)" action script may continue to monitor the BEL component 730 for the predicate "seesObstacle(Shafer)" until the "moveTo" primitive action is completed.

When the Shafer robot agent 102 approaches an obstacle, such as the edge of the table 116, the obstacle detection primitive action executed by the Shafer robot agent 102 returns True. This return value may be the result of a one-time call at the middleware 702. The connection between the GM/AM component 734 and the Shafer robot agent 102 may be closed until it is opened again by the next obstacle detection request in the action script. This return value is received by the GM/AM component 734, which results in a call to the BEL component 730 asserting the "seesObstacle(Shafer)" predicate. When the BEL component 730 is next queried during the execution of the walk script by the GM/AM component 734 using the persistent GM/AM component 734 to BEL component 730 connection, the predicate is detected resulting in the failure of the action. Failure of the "walk(X,Y)" script first triggers another one-shot call from the GM/AM component 734 to the Shafer robot agent 102 to execute a stop action script. This call is routed in the same fashion as the "moveTo" primitive action and the obstacle detection primitives were, via one shot calls to methods bound to specific middleware IDs in the GM/AM component 734. The Shafer robot agent 102 stops walking before reaching the edge of the table 116. Finally, the "walk(X,Y)" action script in the GM/AM component 734 returns a goal failure message within the script interpreter that contains obstacle detection as the reason for the failure.

The failure in the "walk(X,Y)" action script results in a failure in the parent tell action script, which called it. The failure in the tell action script results in a failure of the overall goal, which as noted above may be represented as do(tell(Dempster,Shafer,(walk(Shafer,forward))))

The DM component 724 monitors the status of this goal by polling the GM/AM component 734 using its persistent connection to the GM/AM component 734. When the goal fails, the GM/AM component 734 may pass the failure conditions to the DM component 724 and the polling may end. As a result of the failure, the DM component 724 may submit a new goal to the GM/AM component 734 which may be represented as do(sayText(Dempster,failureReason))

This may result in the GM/AM component 734 selecting a "sayText" action script for the Dempster robot agent 103 and performing a one shot call to the Dempster robot agent 103 using the stored middleware ID.

As described above, the mapping between the middleware IDs and the architecture IDs and the appropriate handling of architecture IDs by the architecture has allowed for the desired performance by the system.

Other Examples

As another example, a first agent may use one or more vision components on one or more second agents for object detection. For example, a cloud-based intelligent agent that is intended to perform security functions may utilize a vision component of a lawnmower robot to check whether the front door of a house is open. In another example, the security agent may utilize the vision component of a delivery drone agent to check whether a car is parked in the drive way.

In these examples, a remote agent tasked with performing an operation that requires vision at a distant location may send a geo-location request to the middleware about the availability of a vision component in that particular location. In the case of the lawnmower robot, the vision component may include a camera mounted on the lawnmower robot. To locate a vision component, the GM/AM component of the virtual security agent may determine that the appropriate place to look at the front door from the lawn is the following range [bestlong±deltalong][bestlat±deltalat] where bestlong is the best longitudinal position, bestlat is the best latitudinal position, and the deltas are tolerable deviations. The GM/AM component may make the following call:

requestLocalComponentList(<GM/AmcomponentID>,
   <GM/Amcomponentcre dentials>, constraints)
where "constraints" may be this list:
[and [isa type "vision"][isavailable true][longituderange
   bestlong deltalong][latituderange bestlat deltalat]]

Based on the API call, the registry service 314 and/or the discovery service 314 and/or the discovery service 302 may search the registry 316 for all available vision components located within the tolerance of the best location for observing the front door. It should be understood that the GM/AM component of the virtual security agent need not know what system the vision component is located on. For example, the vision component could be located on the lawnmower, but could also be located on a drone that happens to fly by or some other agent (such as a cell phone a pedestrian is holding). The registry service 314 then matches the constraints against the entries 400 of the registry 316, including any possible agent group constraints, e.g., that any consumer of the vision component's services must belong to the same agent group of the agent originally instantiating the component, e.g., the lawnmower agent, or the home security agent group to which the home security agent. It may also check for appropriate credentials (e.g., that it is allowed to use the camera on the cell phone of the pedestrian whose wireless interface just connected to the home's open WiFi).

If the home security agent gets back an empty list, the observation fails and it may move on with other activities, such as notifying the user that it cannot check the front door or "tasking" the lawnmower, if it knows there is one, to drive to that location (or attempting to contact the pedestrian who connected their phone to the home's WiFi making a verbal request to check for the open door).

However, since the lawnmower robot is mowing the lawn in front of the house, it may be determined to be in the right location to observe whether the door of the house is open. This determination may be made by a middleware reasoning component that is capable of performing spatial reasoning, such as determining based on two geo-locations whether one location is within visible range of the other. Hence, a determination is made that the request can be satisfied by the lawnmower robot, and the query is performed. For example, the discovery service 302 may return a non-empty list that includes the lawnmower robot to the home security agent. The home security agent may then issue call to the lawnmower agent or possibly to all components in the list:

```
foreach(component C: returned-component-list) {
    -one-shot-
call(C,<GM/AmcomponentID>,<GM/Amcomponentcredentials>,takePicture,orientati
on)
}
```

This call may make a one shot call to all remote components, e.g., the lawnmower agent, passing along the GM/AmcomponentID and GM/Amcomponentcredentials as well as the requested service, e.g., "takePicture", and any parameters such as "orientation" which takes a picture in the direction of an orientation variable, such as with 0 degrees being north. The lawnmower robot may return an image, which the GM/AM component of the home security agent can further process possibly using additional remote components for open doors. For example, the lawnmower robot's vision component may be unable to detect what a door is, but it may be able to take a picture of the front of the house, e.g., it may be able to determine where the front of the house is and take a picture of the front of the house, and return it to the requesting component. The requesting component may then perform an "open door" detection analysis on the received image. Alternatively, the lawnmower robot could itself make a cascading request to another functional component in the agent group that can perform the "open door" detection analysis, send the captured image to this other functional component, receive the result, and forward the result to the original component.

In other embodiments, the home security agent may request connections to one or more of the components on the list. For example, in the case of the lawnmower used to check whether the front door of a house was open, the requesting component first performed the above call In other embodiments, the home security agent may make the above call with the constraint "visibileWithin" whose value the middleware may determine based on the geo-location of the front door. The discovery service 302 may determine that a GM and vision component are running on the same host, i.e., the lawnmower robot. The home security agent issue a goal request "takePicture(geolocation)", which GM of the lawnmower robot is able to do. The lawnmower robot may return the captured image for local processing by the home security agent to determine whether the door is open.

Regarding the driveway car detection example, the request may be sent to a drone agent this is determined to be close to the house. The drone agent may need to decide whether it can afford scheduling a detour on its way to a different location, e.g., for a package delivery operation. In this example, not only is a single component shared, but the agent hosting the component has to perform a sequence of actions in order to satisfy the pre-conditions required for using the remote use of the component, in this case maneuvering the drone agent over the requisite driveway to allow it to take a picture of the driveway. Similar to the above example, depending on whether the drone agent can itself detect a car, the drone agent may be able to answer the question of whether a car is in the driveway directly, or it might need to hand off that determination to yet another shared component.

Figure 8:
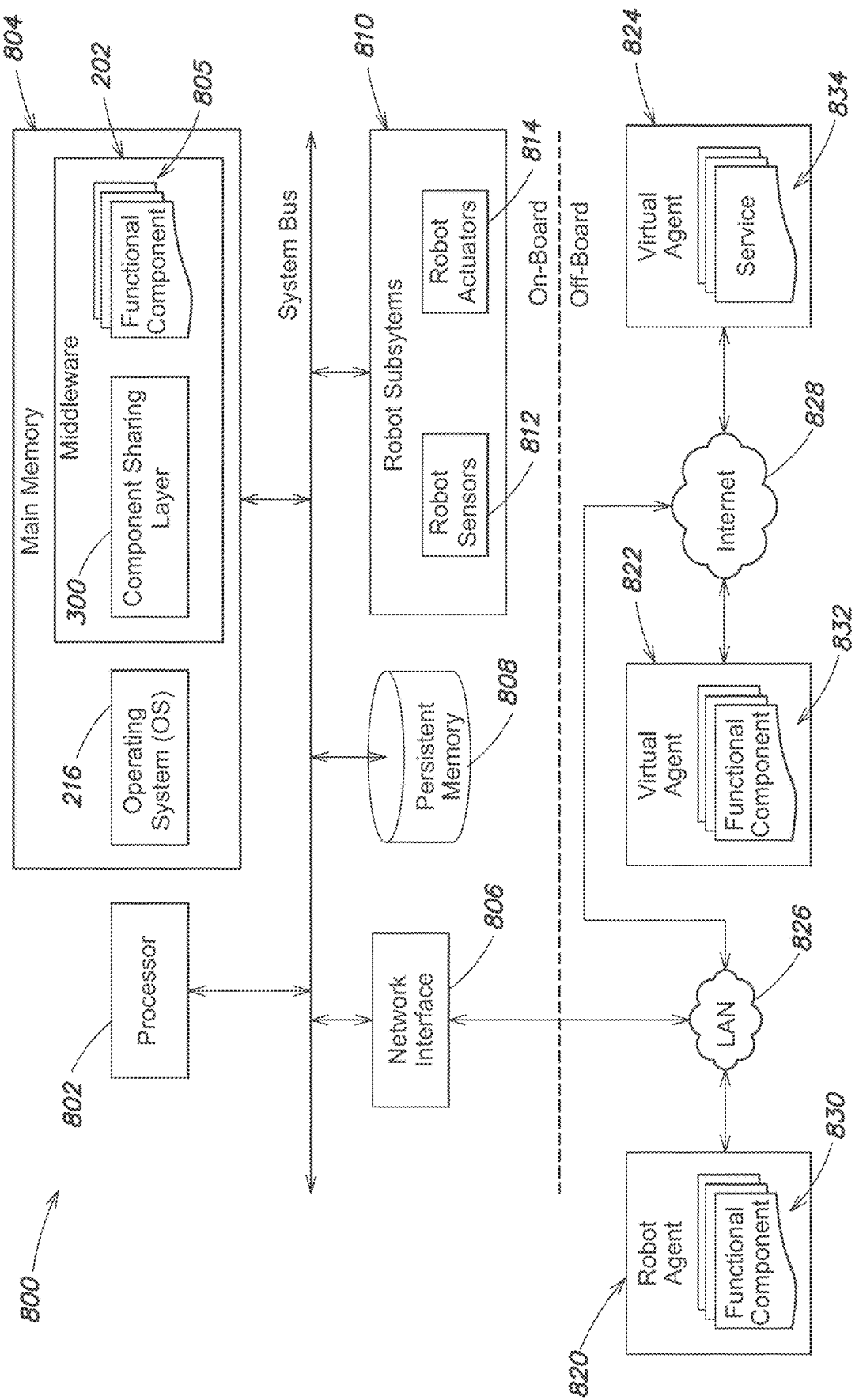
FIG. 8 is a schematic illustration of an example robot agent in accordance with one or more embodiments.

FIG. 8 is a schematic illustration of an example robot agent 800 in accordance with one or more embodiments. The robot agent 800 may include one or more processors, such as processor 802, which may Central Processing Units (CPUs), Digital Signal Processors (DSPs), microprocessors, Field Programmable Gate Arrays (FPGAs), Application Specific Integrated Circuits (ASICs), Systems on Chips (SoCs) or combinations thereof. The robot agent 800 may further include a main memory 804, which may store a plurality of programs, libraries or modules, such as the Operating System (OS) 216, and one or more applications running on top of the OS 216, such as the middleware 202, which may include the component sharing layer 300 and a plurality of functional components indicated at 805. The robot agent 800 may also include a network interface card (NIC) 806, a persistent memory 808, and one or more robot subsystems, indicated at 810, which may include one or more robot sensors 812, and one or more actuators 814. The processor 802, main memory 804, NIC 806, persistent memory 808, and subsystems 810 may be interconnected by one or more busses, such as a system bus 816.

The processor 802, main memory 804, NIC 806, persistent memory 808, and robot subsystems 810 may be considered on-board elements as indicated by demarcating line 818.

The robot agent 800 may have access to one or more off-board elements, such as functional components and/or services. For example, the robot agent 800 may have access to functional components and/or services hosted and/or instantiated at other intelligent agents. For example, the robot agent 800 may be in communicating relationship with another robot agent 820 and two virtual agents 822 and 824 through one or more data communication networks, such as a Local Area Network (LAN) 826 and the Internet 828. The other robot agent 820 and the virtual agents 822 and 824 each may be running one or more functional components and/or services as indicated at 830, 832 and 834, respectively. The robot agent 800 together with the robot agent may form an agent group. Accordingly, at least some of the functional components and/or services 830, 832, and 834 may be shared with the robot agent 800.

It should be understood that the robot agent 800 of FIG. 8 is meant for illustrative purposes only, and that the present disclosure may be used with intelligent systems having other architectures or designs.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used.

Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A method comprising:
associating a first virtual agent and a second virtual agent with an agent group, wherein the second virtual agent is different from the first virtual agent;
advertising by the second virtual agent to the first virtual agent one or more services provided by a functional component running at the second virtual agent;
storing the one or more services advertised by the second virtual agent at a registry at the first virtual agent;
establishing a goal to be achieved by the first virtual agent;
creating by the first virtual agent a set of tasks to achieve the goal;
determining that the first virtual agent lacks a functional component needed to perform at least one task from the set of tasks;
searching the registry for a functional component capable of performing the at least one task;
identifying, in response to the searching, the one or more services provided by the functional component running at the second virtual agent as capable of performing the at least one task;
establishing a communication link between the first virtual agent and the second virtual agent;
issuing, by the first virtual agent using the communication link, a request for the one or more services to be performed by the functional component running on the second virtual agent;
performing the one or more services by the functional component running at the second virtual agent, the performing producing a result;
returning the result from the second virtual agent to the first virtual agent using the data communication link; and
utilizing the result at the second virtual agent as part of the set of tasks for achieving the goal;
wherein the advertising the one or more services by the second virtual agent includes presenting one or more pre-conditions of the one or more services and one or more post-conditions of the one or more services;
wherein the advertising the one or more services by the second virtual agent further includes presenting a failure condition of the one or more services and a name of the one or more services or of the functional component running at the second virtual agent;
wherein the at least one task has a pre-condition, an operating condition, and a post-condition the advertising further includes presenting one or more operating conditions of the one or more services, and the searching includes comparing the pre-condition, the operating condition, and the post-condition of the at least one task with pre-conditions, operating conditions, and post-conditions included in the registry; and
wherein the operating condition of the at least one task is associated with a location, the advertising the one or more services by the second virtual agent further includes presenting geo-location information of the second virtual agent, and the searching includes comparing the location with the geo-location information of the second virtual agent.

2. The method of claim 1 wherein the operating condition of the at least one task is associated with a location, the advertising the one or more services by the second virtual agent further includes presenting geo-location information of the second virtual agent, and the searching includes comparing the location with the geo-location information of the second virtual agent.

3. The method of claim 1 further comprising:
determining, following the identifying step, that the first virtual agent and the second virtual agent belong to the agent group.

4. The method of claim 1 further comprising:
closing the communication link following the returning of the result from the second virtual agent such that the request for the one or more services to be performed by the functional component running at the second virtual agent is a one-shot call by the first virtual agent.

5. The method of claim 1 wherein the first virtual agent and the second virtual agent are combinations of autonomous robot agents or intelligent agents.

6. The method of claim 1 wherein the functional component proving the one or more services is:
a vision component;
a motion component;
an automatic speech recognition (ASR) component;
a dialogue manager;
an action planning component;
a machine learning component;
a reasoning component; or
a natural language processing (NLP) component.

7. The method of claim 1 further comprising:
associating credentials with the first virtual agent; and
checking, by the second virtual agent, the credentials of the first virtual agent before the performing the one or more services by the functional component running at the second virtual agent.

8. The method of claim 1 further comprising:
determining, during online operation of the second virtual agent, that a new service has become available at the second virtual agent;
notifying the first virtual agent by the second virtual agent to of the new service; and
adding the new service to the registry at the first virtual agent.

9. The method of claim 1 in which the first virtual agent and the second virtual agent form a super-agent in which a given set of functional components running at the first virtual agent and at the second virtual agent cooperate to achieve the goal.

10. The method of claim 9 wherein the given set of functional components that cooperate to achieve the goal include a sensing component, a reasoning component, an action planning component, and an effector component.

11. The method of claim 1, further comprising:
determining, following the identifying step, that the first virtual agent and the second virtual agent belong to the agent group; and
closing the communication link following the returning of the result from the second virtual agent such that the request for the one or more services to be performed by the functional component running at the second virtual agent is a one-shot call by the first virtual agent;

wherein the first virtual agent and the second virtual agent are combinations of autonomous robot agents or intelligent agents.

12. The method of claim 11, further comprising:
associating credentials with the first virtual agent;
checking, by the second virtual agent, the credentials of the first virtual agent before the performing the one or more services by the functional component running at the second virtual agent;
determining, during online operation of the second virtual agent, that a new service has become available at the second virtual agent;
notifying the first virtual agent by the second virtual agent to of the new service; and
adding the new service to the registry at the first virtual agent;
wherein the first virtual agent and the second virtual agent form a super-agent in which a given set of functional components running at the first virtual agent and at the second virtual agent cooperate to achieve the goal; and
wherein the given set of functional components that cooperate to achieve the goal include a sensing component, a reasoning component, an action planning component, and an effector component.

13. A method comprising:
associating a first virtual agent and a second virtual agent with an agent group, wherein the second virtual agent is different from the first virtual agent;
advertising by the second virtual agent to the first virtual agent one or more services provided by a functional component running at the second virtual agent;
storing the one or more services advertised by the second virtual agent at a registry at the first virtual agent;
establishing a goal to be achieved by the first virtual agent;
creating by the first virtual agent a set of tasks to achieve the goal;
determining that the first virtual agent lacks a functional component needed to perform at least one task from the set of tasks;
searching the registry for a functional component capable of performing the at least one task;
identifying, in response to the searching, the one or more services provided by the functional component running at the second virtual agent as capable of performing the at least one task;
establishing a communication link between the first virtual agent and the second virtual agent;
issuing, by the first virtual agent using the communication link, a request for the one or more services to be performed by the functional component running on the second virtual agent;
performing the one or more services by the functional component running at the second virtual agent, the performing producing a result;
returning the result from the second virtual agent to the first virtual agent using the data communication link;
utilizing the result at the second virtual agent as part of the set of tasks for achieving the goal;
associating credentials with the first virtual agent;
checking, by the second virtual agent, the credentials of the first virtual agent before the performing the one or more services by the functional component running at the second virtual agent;
determining, during online operation of the second virtual agent, that a new service has become available at the second virtual agent;
notifying the first virtual agent by the second virtual agent to of the new service; and
adding the new service to the registry at the first virtual agent;
wherein the first virtual agent and the second virtual agent form a super-agent in which a given set of functional components running at the first virtual agent and at the second virtual agent cooperate to achieve the goal; and
wherein the given set of functional components that cooperate to achieve the goal include a sensing component, a reasoning component, an action planning component, and an effector component.

14. A non-transitory machine-readable medium having instructions stored thereon, the instructions when executed by a data processor cause said processor to perform functions including:
associating a first virtual agent and a second virtual agent with an agent group, wherein the second virtual agent is different from the first virtual agent;
advertising by the second virtual agent to the first virtual agent one or more services provided by a functional component running at the second virtual agent;
storing the one or more services advertised by the second virtual agent at a registry at the first virtual agent;
establishing a goal to be achieved by the first virtual agent;
creating by the first virtual agent a set of tasks to achieve the goal;
determining that the first virtual agent lacks a functional component needed to perform at least one task from the set of tasks;
searching the registry for a functional component capable of performing the at least one task;
identifying, in response to the searching, the one or more services provided by the functional component running at the second virtual agent as capable of performing the at least one task;
establishing a communication link between the first virtual agent and the second virtual agent;
issuing, by the first virtual agent using the communication link, a request for the one or more services to be performed by the functional component running on the second virtual agent;
performing the one or more services by the functional component running at the second virtual agent, the performing producing a result;
returning the result from the second virtual agent to the first virtual agent using the data communication link; and
utilizing the result at the second virtual agent as part of the set of tasks for achieving the goal;
wherein the advertising the one or more services by the second virtual agent includes presenting one or more pre-conditions of the one or more services and one or more post-conditions of the one or more services;
wherein the advertising the one or more services by the second virtual agent further includes presenting a failure condition of the one or more services and a name of the one or more services or of the functional component running at the second virtual agent;
wherein the at least one task has a pre-condition, an operating condition, and a post-condition the advertising further includes presenting one or more operating conditions of the one or more services, and the searching includes comparing the pre-condition, the operating condition, and the post-condition of the at least one task with pre-conditions, operating conditions, and post-conditions included in the registry; and wherein the operating condition of the at least one task is associated with a location, the advertising the one or more services by the second virtual agent further includes presenting geo-location information of the second virtual agent, and the searching includes comparing the location with the geo-location information of the second virtual agent.

* * * * *